United States Patent
Tweedy et al.

(10) Patent No.: US 6,913,134 B2
(45) Date of Patent: Jul. 5, 2005

(54) METHOD AND APPARATUS FOR CHANGING THE ORIENTATION OF WORKPIECES ABOUT AN ANGLED AXIS FOR A DECORATOR

(75) Inventors: Mark R. Tweedy, Valencia, PA (US); Carl J. Strutz, Mars, PA (US); John M. Zwigart, New Brighton, PA (US); Gary W. McCoy, Butler, PA (US)

(73) Assignee: Carl Strutz & Co., Inc., Mars, PA (US)

( * ) Notice: Subject to any disclaimer, the term of this patent is extended or adjusted under 35 U.S.C. 154(b) by 0 days.

(21) Appl. No.: 10/600,717

(22) Filed: Jun. 20, 2003

(65) Prior Publication Data

US 2004/0020746 A1 Feb. 5, 2004

Related U.S. Application Data

(62) Division of application No. 09/625,604, filed on Jul. 26, 2000, now Pat. No. 6,581,750.

(51) Int. Cl.⁷ .............................................. B65G 47/24
(52) U.S. Cl. ..................................... 198/408; 198/476.1
(58) Field of Search ................................ 198/408, 410, 198/377.07, 378, 470.1, 476.1

(56) References Cited

U.S. PATENT DOCUMENTS

| | | | |
|---|---|---|---|
| 2,261,255 A | 2/1941 | Jackson et al. | |
| 2,231,535 A | 11/1941 | Jackson | |
| 2,721,516 A | 10/1955 | Campbell et al. | |
| 3,146,705 A | 9/1964 | Ritzerfeld et al. | |
| 3,251,298 A | 5/1966 | Rudolph et al. | |
| 3,338,574 A | 8/1967 | Rudolph et al. | |
| 3,407,915 A | 10/1968 | Strutz et al. | |
| 3,563,377 A | * 2/1971 | Southcott | 198/408 |
| 3,648,821 A | 3/1972 | Rudolph et al. | |
| 4,690,050 A | * 9/1987 | Rouly et al. | 198/408 |
| 5,524,535 A | 6/1996 | Strutz et al. | |
| 6,581,750 B1 | * 6/2003 | Tweedy et al. | 198/377.07 |

* cited by examiner

Primary Examiner—Joseph Valenza
(74) Attorney, Agent, or Firm—Clifford A. Poff

(57) ABSTRACT

A workpiece transfer for a decorating machine includes transport conveyors for carrying workpieces to the decorating machine and from the decorating machine. The conveyors support each of the workpieces such that an elongated longitudinal axis of each workpiece is vertically orientated. The decorating machine has a decorator conveyor with spaced workpiece carriers to support a workpiece for rotation about the longitudinal axis of the workpiece in a horizontal orientation. A plurality of workpiece grippers pivotally supported by a drive hub support the workpieces during movement of the longitudinal axis thereof between the vertical orientation and the horizontal orientation. A drive shaft is secured to the drive hub to rotate about an axis forming acute angles with the longitudinal axis of a workpiece in each of the horizontal orientation and the vertical orientation. The acute angles are preferably 45°. The pivotal axis of the pivots used to support the workpiece grippers on the drive hub extend in a plane perpendicular to the axis about which the drive shaft rotates. Control rods are slidably supported and interconnect the workpiece grippers with cam followers residing in a cam track of a stationary barrel cam for pivotally displacing the workpiece grippers for controlling the delivery and reception orientations of workpieces with respect to the transport conveyor and the decorator conveyor. Pivoting of the control rods by the cam occurs in a timed relation with rotary motion of the workpiece gripper for continuous motion of a workpiece in a substantially matched speed and direction of conveyance by the workpiece conveyors and the decorating conveyor.

29 Claims, 26 Drawing Sheets

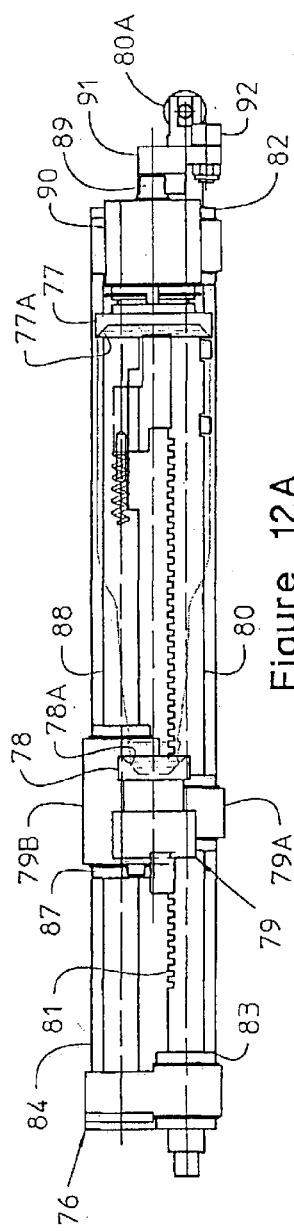
Figure 12A
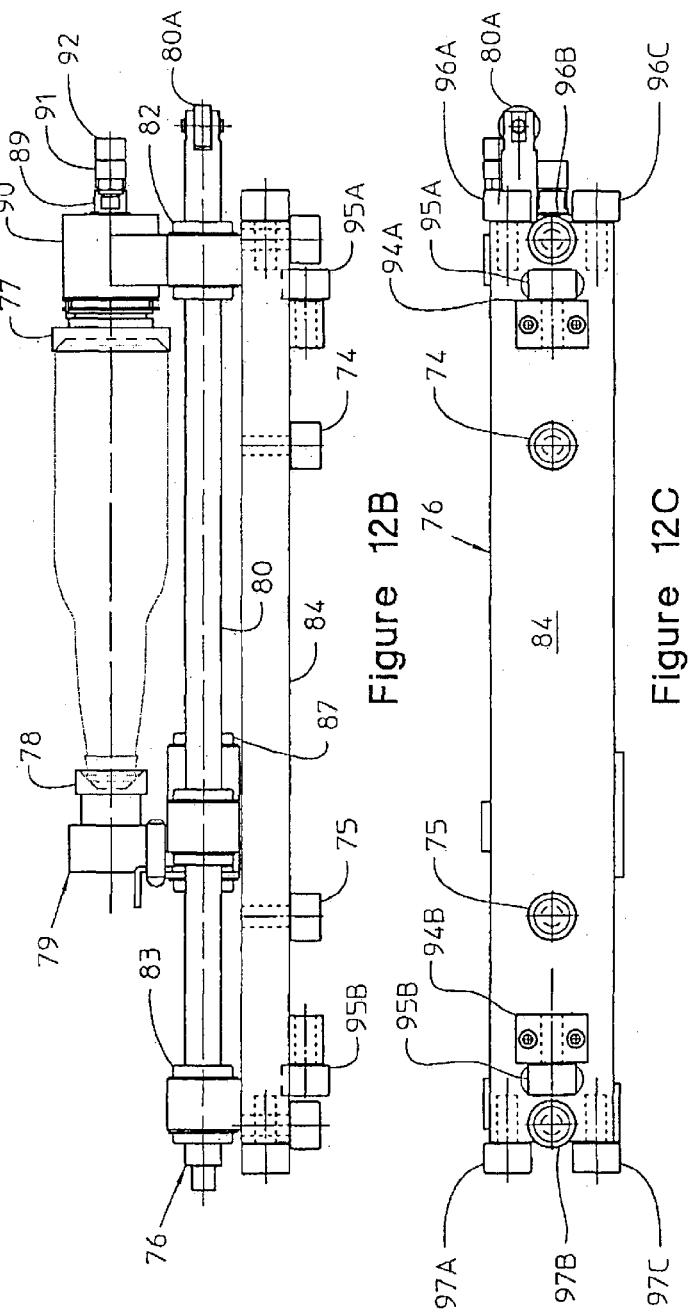
Figure 12B
Figure 12C

METHOD AND APPARATUS FOR CHANGING THE ORIENTATION OF WORKPIECES ABOUT AN ANGLED AXIS FOR A DECORATOR

CROSS REFERENCE TO RELATED APPLICATIONS

This application is a Division of application Ser. No. 09/625,604, filed Jul. 26, 2000, now U.S. Pat No. 6,581,750 Entitled: METHOD AND APPARATUS FOR CHANGING THE ORIENTATION OF WORKPIECES ABOUT AN ANGLED AXIS FOR A DECORATOR.

BACKGROUND OF THE INVENTION

1. Field of the Invention

The present invention relates to workpiece supply and delivery systems situated upstream and downstream of the flow of a workpiece through one or more decorating stations of a decorating machine and, more particularly, to construction and operation of a workpiece transfer mechanism designed to operate about an angled axis for automatically changing a vertical to horizontal or a horizontal to vertical orientations of the workpieces with continuous motion or, if desired, intermittent motion.

2. Description of the Prior Art

U.S. Pat. Nos. 2,231,535; 2,261,255; 2,721,516; 3,146,705; 3,388,574; and 5,524,535 disclose intermittent motion type decorating machines using an indexing drive system to impart intermittent traveling motion to an endless conveyor chain provided with workpiece carriers used to supply workpieces such as a bottle made of glass or plastic. A chain conveyor disclosed in U.S. Pat. No. 3,388,574 is provided with workpiece carriers arranged in a side-by-side relation and used for supporting each bottle in a horizontal orientation while intermittently moved along a path of travel through a decorating apparatus. The bottle is supported at its opposite ends by clamping chucks one of which is driven by a crank arm on a journal extending from a bearing support and the other clamping chuck is moveable to releasably engage and rotatably support the bottle about a horizontal axis extending along the extended length of the bottle. The bottle is rotated by a drive member brought into a driving relation with the crank arm on the protruding journal from the bearing support. The clamping chucks are operatively supported on a base which is secured to chain-links forming the endless conveyor chain extending along the path of travel of bottles through the decorating machine.

In intermittent motion decorating machines, a bottle is moved by the endless chain conveyor through a predetermined distance, stopped, moved again through a predetermined distance, stopped and again moved until each bottle advances by the sequence of motions completely through all of the decorating stations of the decorating machine. A decorating station will be provided at one or more places where the bottle comes to a stop. The decorating cycle is essentially made up of two equal parts. One half of the decorating cycle is used for the decoration and the remaining half of the cycle is used for the indexing movement of the bottle through the decorating machine. There was no overlap between the decorating and indexing cycles.

At each decorating station while the bottle is stopped from traveling motion, a decorating screen is displaced into line contact by an associated squeegee with the surface of the bottle while the bottle is rotated about the longitudinal axis thereof. During the first part of the decorating cycle, the screen is moved synchronous with the peripheral speed of the rotating bottle to avoid smearing during decoration at the line contact established by a squeegee with the bottle. The squeegee remains stationary during the decorating process. When the screen moves to the end of its travel, the bottle has rotated 360° whereupon the screen drive mechanism maintains the screen stationary for the remaining part of the decorating cycle while the bottle is moved from the decorating station and an undecorated bottle is positioned at the decorating station.

Thermosetting ink was usually the printing medium in decorating machines, particularly when multiple color decoration was desired. Ink of only one color is applied at each decorating station and to decorate with multiple colors requires a multiple of corresponding decoration stations. When the different colors interleave in a given area of the bottle, because the same area is contacted with a screen for each color it is necessary that the applied ink/color is a solid and will not smear when additional ink/color is applied. Although the thermosetting ink is solidified after each printing operation, it is necessary to cure the ink by feeding the bottles through a furnace after discharging from the decorating machine. In co-pending patent application Ser. No. 09/079,753 filed May 15, 1998 there are disclosed a decorating method and apparatus to allow curing of ink decoration applied at one decorating station before additional decoration is applied. The dwell period of the intermittent advancing motion by the conveyor chain is used to apply decoration and to cure the applied decoration all at different spaced apart sites along the course of travel by the bottles in the decorating machine. All the decoration on a bottle delivered from the decoration machine can be cured so that the bottles can be loaded directly into a shipping container.

As disclosed in U.S. Pat. No. 5,524,535 the machine cycle in an intermittent motion decorating machine is altered to attain an increase to the workpiece decoration rate. The altered machine cycle provides that the portion of the cycle for conveyor indexing has a reduced duration in order to provide an increased part of the machine cycle for decorating. The conventional chain conveyor required an indexer drive to transmit the torque required to rapidly accelerate and decelerate a chain conveyor laden with carriers and including the compliment of bottles or workpieces processed in a decorating machine. A deviation to the use of a chain conveyor for workpieces in an intermittent decorating machine is disclosed in co-pending application Ser. No. 09/209,839, filed Oct. 8, 1998 and notably includes the use of elongated barrel cams and transfer disks arranged to provide a continuous traveling motion to workpiece carriers which is interrupted only at each decorating station and, when provided, at each curing station.

An alterative to an intermittent motion decorating machine is a continuous type motion decorating machine as disclosed, for example, in U.S. Pat. No. 3,251,298 to decorate a bottle during continuous, uninterrupted, linear travel on a conveyor along one or more spaced apart decorating stations. It is necessary to match the speed of the linear advancement of a squeegee at a decorating station with the linear speed of advancement of the bottle by the conveyor and match the speed of the peripheral speed of the bottle with the linear speed of a decorating screen. The occurrences of speed matching are required at each decorating station in the machine. The continuous motion of the conveyor eliminated the need for an indexer box to provide the intermittent motion by the conveyor in an intermittent motion decorating machine.

In U.S. Pat. No. 3,407,915 a main conveyor is constructed to reorientate workpieces from the generally vertical position to a generally horizontal position for registration and decoration and then back to a generally vertical position for discharge from the main conveyor. Unlike conventional conveyors for decorating machines, the conveyor has two functions, that is, its normal function of conveying the workpieces through the decorating machine and the additional function of reorienting the workpiece from a vertical position to a horizontal position and then back to a vertical position. The combination of the two functions sought to eliminate the need for additional equipment to reorientate the supply of bottles to and from the conveyor of the decorating machine.

U.S. Pat. No. 3,648,821 discloses a workpiece transferring apparatus to transfer workpieces individually from a supply conveyor to a decorator conveyor where decoration is applied while the workpieces are horizontally oriented in an intermittent type decorating machine and thence from a decorator conveyor to a delivery conveyor in which the transfer operations produce horizontal to vertical reorientations of the workpieces. The change to the workpiece orientation also occurs between a conveyor supplying bottles in a vertical orientation and the conveyor supplying the bottled in a horizontal orientation to a decorating machine. Each workpiece is repositioned by rotary type movements about two perpendicular and intersecting axes, one of which is the rotational axis of a rotary support shaft extending parallel with the rotational axes of the drive sprockets for the chain conveyor. The mass of material comprising the workpiece and support structure undergoing the rotary type movements limits the operating speed. Workpiece handling equipment disclosed in U.S. Pat. No. 5,524,535 enables an increase to the workpiece handling rate by a design of structural parts eliminating pivot arms positioned by a spring to reduce an adverse effect of inertia. Captive restraints hold each workpiece during transfer from a feed conveyor to the conveyor of the decorating machine and from the conveyor of the decorating machine to the delivery conveyor.

It is an object of the present invention to provide a workpiece transfer for suppling and unloading workpieces in a decorator machine by gripping and releasing each workpiece during the transferring operations by movement into and out of receiving and hand-off sites with great precision.

It is another object of the present invention to provide a workpiece transfer embodying a construction of parts to grip a workpiece while in a freestanding condition on a moving conveyor, reorientate and transfer the workpiece to a workpiece carrier while moving or at dwell period of operation of the conveyor system and then take the workpiece from the carrier while moving or at dwell period of operation by the conveyor system, reorientate the workpiece to again regain a freestanding condition and released for advancing movement by a moving conveyor.

It is another object of the present invention to provide an improved transfer for transferring workpieces for a decorator conveyor of a decorating machine to and/or from transport conveyors used to supply and/or deliver workpieces for the decorating machine.

It is a further object of the present invention to provide a workpiece transfer for moving workpieces by either an intermittent motion or continuous motion.

It is another object of the present invention to provide a workpiece transfer for moving workpieces to and/or from an intermittent chain conveyor system driven by an indexer box or, if desired, a continuous motion conveyor system using cams and workpiece carrier disks.

It is an object of the present invention to provide a workpiece transfer for supplying workpieces to a decorating machine particularly bottles at a greater throughput rate than heretofore attainable.

It is a further object of the present invention to provide an apparatus to transfer workpieces for either or both of the supply and unloading of workpieces from a decorating machine wherein the transfer is constructed for high speed motions between a supply conveyor where the workpieces are vertically oriented and a decorator conveyor where the workpieces are horizontally oriented for decoration as well as at the delivery end of the decorating conveyor where the workpieces again undergo high speed motions from the horizontal orientation to the vertical orientation on a discharge conveyor.

SUMMARY OF THE PRESENT INVENTION

According to the present invention there is provided a workpiece transfer to load and unload workpieces for a decorating machine, the workpiece transfer including the combination of at least one workpiece gripper for supporting a workpiece during changing of the orientation thereof from a first orientation to a second orientation wherein a workpiece in the first orientation has a longitudinal central axis orientated in one of a vertical orientation and a horizontal orientation and in the second orientation has the longitudinal central axis in the other of the vertical orientation and horizontal orientation, and a drive to rotate the workpiece gripper about a rotational axis forming acute angles with the longitudinal central axis of a workpiece in each of the vertical orientation and the horizontal orientation.

According to the present invention there is also provided a workpiece transfer including the combination of a transport conveyor for carrying workpieces having an elongated longitudinal axis, the conveyor supporting each of the workpieces with the elongated longitudinal axis in a vertical orientation, a decorator conveyor including spaced apart workpiece carriers to support a workpiece for rotation about the longitudinal axis of the workpiece in a horizontal orientation, a plurality of workpiece grippers on a drive hub for supporting the workpieces during movement of the longitudinal axis thereof between the horizontal orientation and the vertical orientation, a drive shaft secured to the drive hub to rotate about an axis forming acute angles with the longitudinal axis of a workpiece in each of the horizontal orientation and the vertical orientation, pivots extending in a plane perpendicular to the axis about which the drive shaft rotates for pivotally connecting the plurality of workpiece grippers at angularly spaced apart sites to the drive hub, and control rods for pivotally displacing the workpiece grippers about the pivot thereof in a direction generally parallel with the axis about which the drive shaft rotates for controlling the delivery and reception orientations of workpieces with respect to the transport conveyor and the decorator conveyor.

The present invention also provides a method for loading and unloading workpieces for a decorating machine, the method including the steps of releasably gripping a workpiece for changing the orientation thereof from a first orientation to a second orientation wherein a workpiece in the first orientation has a longitudinal central axis orientated in one of vertical or horizontal orientations and in the second orientation has a longitudinal central axis in the other of the vertical or horizontal orientation, rotating the gripped workpiece about a rotational axis forming acute angles with the longitudinal central axis of a workpiece in each of the vertical and horizontal orientations, and pivotally displacing the gripped workpiece in a plane generally parallel with the rotational axis to control receiving and delivery of a workpiece as the longitudinal central axis thereof approaches each of the first orientation and the second orientation.

BRIEF DESCRIPTION OF THE DRAWINGS

The present invention will be more fully understood when the following description is read in light of the accompanying drawings in which:

FIG. 12A is a plan view of a bottle carrier taken along lines XII—XII of FIG. 8;

FIG. 12B is a side elevational view of the bottle carrier shown in FIG. 12A;

FIG. 12C is a bottom plan view of the bottle carrier shown in FIG. 12A;

DETAILED DESCRIPTION OF THE PREFERRED EMBODIMENTS

Figure 1:
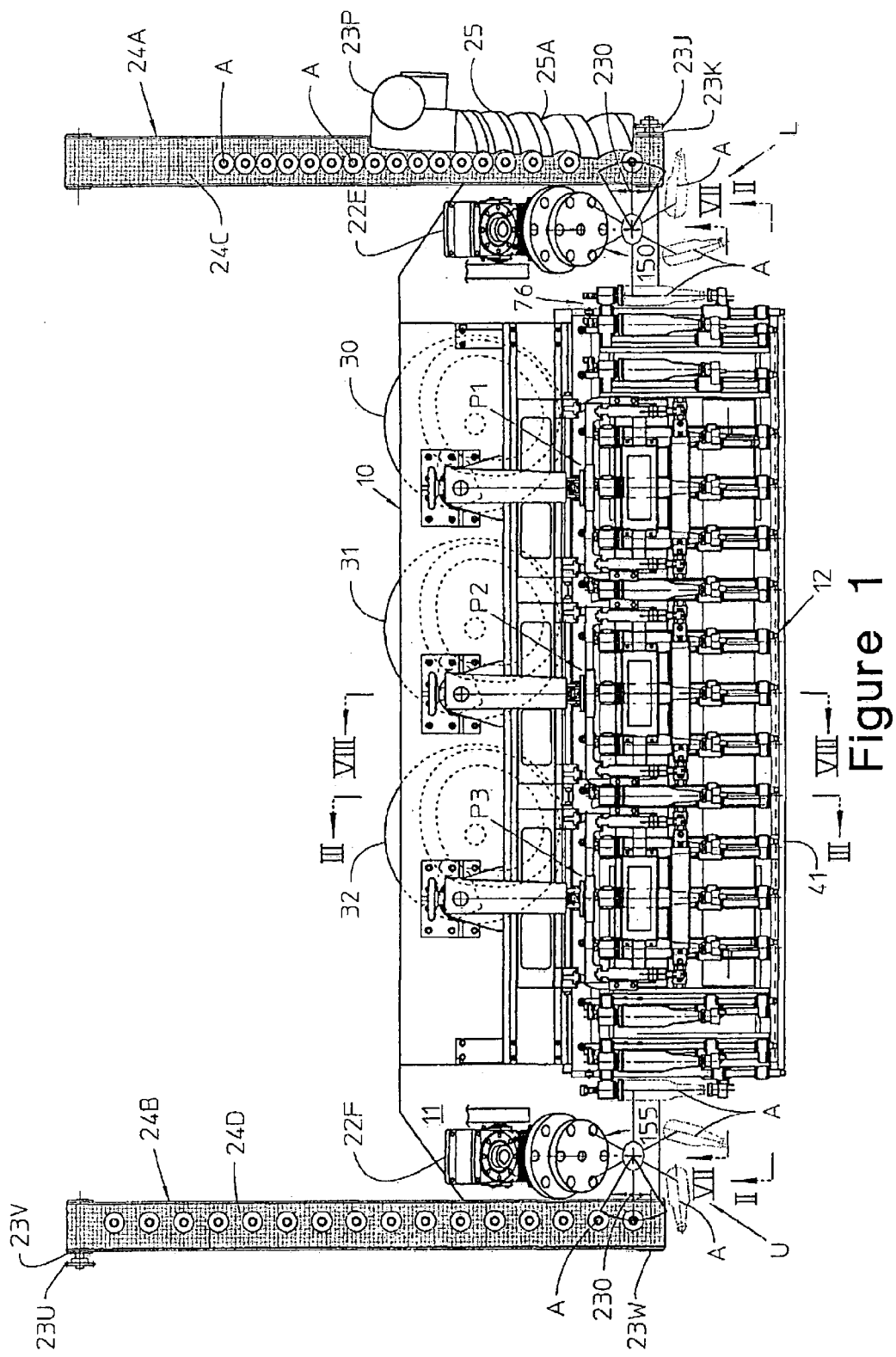
FIG. 1 is a plan view of an intermittent decorating machine having individually movable workpiece carriers for workpieces supplied and delivered according to the method and apparatus of the preferred embodiment of the present invention.
Figure 2:
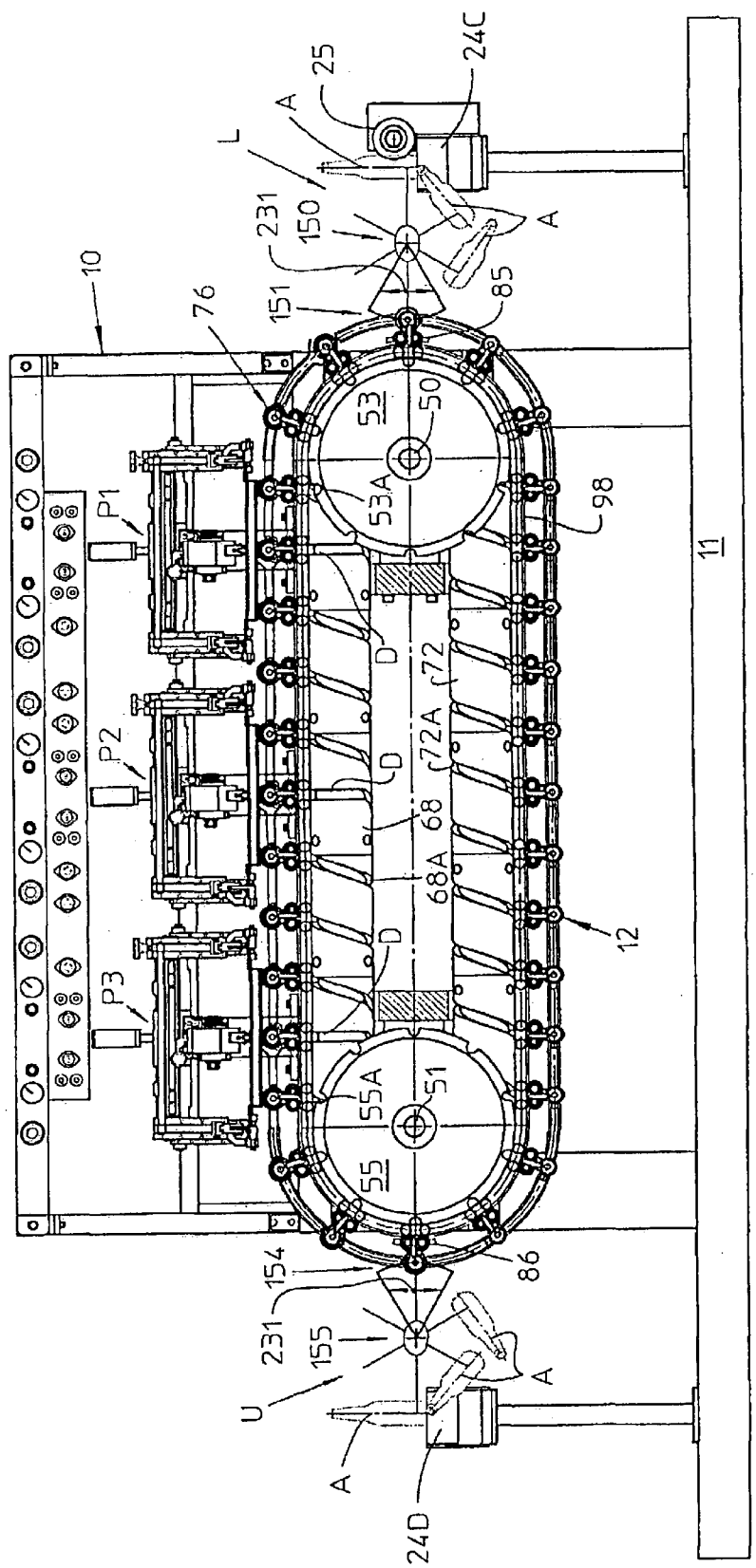
FIG. 2 is a front elevational view taken along lines II—II of FIG. 1.

Referring now to FIGS. 1 and 2 of the drawings, there is illustrated a decorating machine 10 having a base 11 for supporting a workpiece conveyor 12 to convey workpieces which, for the purpose of describing the preferred embodiment of the present invention, consist of bottles. The bottles each have an elongated longitudinal axis A extending centrally in a uniformly spaced relation from the center of the bottle and centered along the elongated length of the bottle. The axis A of a bottle is changed from the vertical to the horizontal by bottle loading equipment L and remains horizontal while the bottles are conveyed by conveyor 12 along three successively arranged decorating stations P1, P2 and P3. The bottles are advanced from the last decorating station P3 to bottle unloading equipment U.

The drive arrangement for the bottle loading equipment L, the decorating machine and the bottle unloading equipment U include, as shown in FIGS. 3–6, a main drive motor 14 having a drive output shaft connected by a belt 14A to a first line shaft 15 rotatably supported by spaced apart pillow blocks 15A. Spaced along line shaft 15 are five drive output pulleys 16, 17, 18, 19 and 20 provided with belts 16A, 17A, 18A, 19A and 20A, respectively. The belt 20A extends to a pulley on a second line shaft 21 supported by spaced apart pillow blocks 21A and used to drive the bottle loading equipment L and unloading equipment U. For this purpose, drive output pulleys 22A and 22B are connected by belts 22C and 22D, respectively, to drive input shafts of cone worm drives 22E and 22F for workpiece transfer apparatus forming part of the bottle loading equipment L and bottle unloading equipment U. Also driven by the second line shaft 21 are sprockets 23A and 23B connected by drive chains 23C and 23D to sprockets 23E and 23F, respectively, mounted on drive input shafts for supply and delivery conveyors 24A and 24B, respectively. The sprocket 23E for supply conveyor 24A supplies drive torque to a drive shaft 23G which is transferred by drive sprocket 23H through an idler shaft 23I having input and output sprockets connected by chains for driving a sprocket 23J mounted on a drive roller 23K. The drive roller is mounted for rotation at a spaced site from an idler roller 23L to support an endless belt 24C moving at a constant rate of travel to advance undecorated bottles along the course of travel established by the conveyor belt.

Drive shaft 23G is also provided with a drive gear meshing with a drive gear 23M on an idler shaft on which there is also mounted a sprocket for a drive chain 23N used to provide torque to an input shaft for a drive 23P. The drive output gear of the drive 23P is mounted to the end of a timing screw 25 having a helical groove 25A for controlling the advancing movement of bottles by the conveyor as will be described in greater detail hereinafter. The sprocket 23B, drive chain 23D and sprocket 23F of the delivery conveyor 24B supply torque to a drive shaft 23Q which is transferred by meshing drive gears 23R to an idler shaft 23S having a drive output sprocket 23T connected by a chain to a sprocket 23U mounted on a drive roller 23V. The drive roller 23V mounted for rotation at a spaced site from an idler roller 23W for supporting an endless belt 24D used for discharge decorated bottles along the course of travel for handling and shipping. While the bottle supply conveyor 24A and the bottle delivery conveyor 24B utilize horizontally orientated endless belts 24C and 24D, respectively, for supporting bottles, the present invention is equally applicable for use with other forms of conveyors having, for example, bottle carriers to support bottles in alternative ways which include, for example, bottle carriers on supply and delivery conveyors extending along a lateral side or above the conveyance paths for the bottles.

Figure 3:
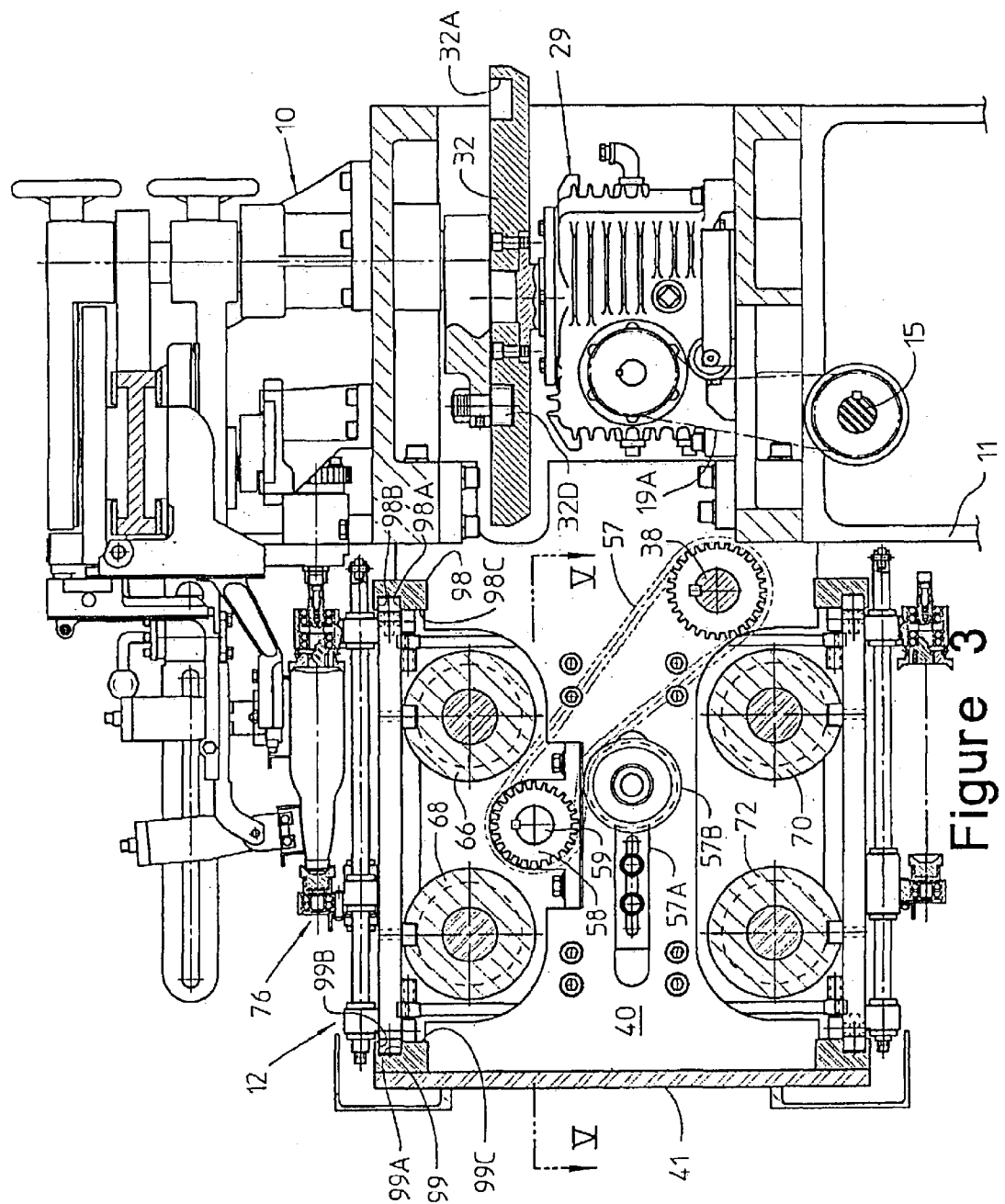
FIG. 3 is a sectional view taken along lines III—III of FIG. 1.
Figure 4:
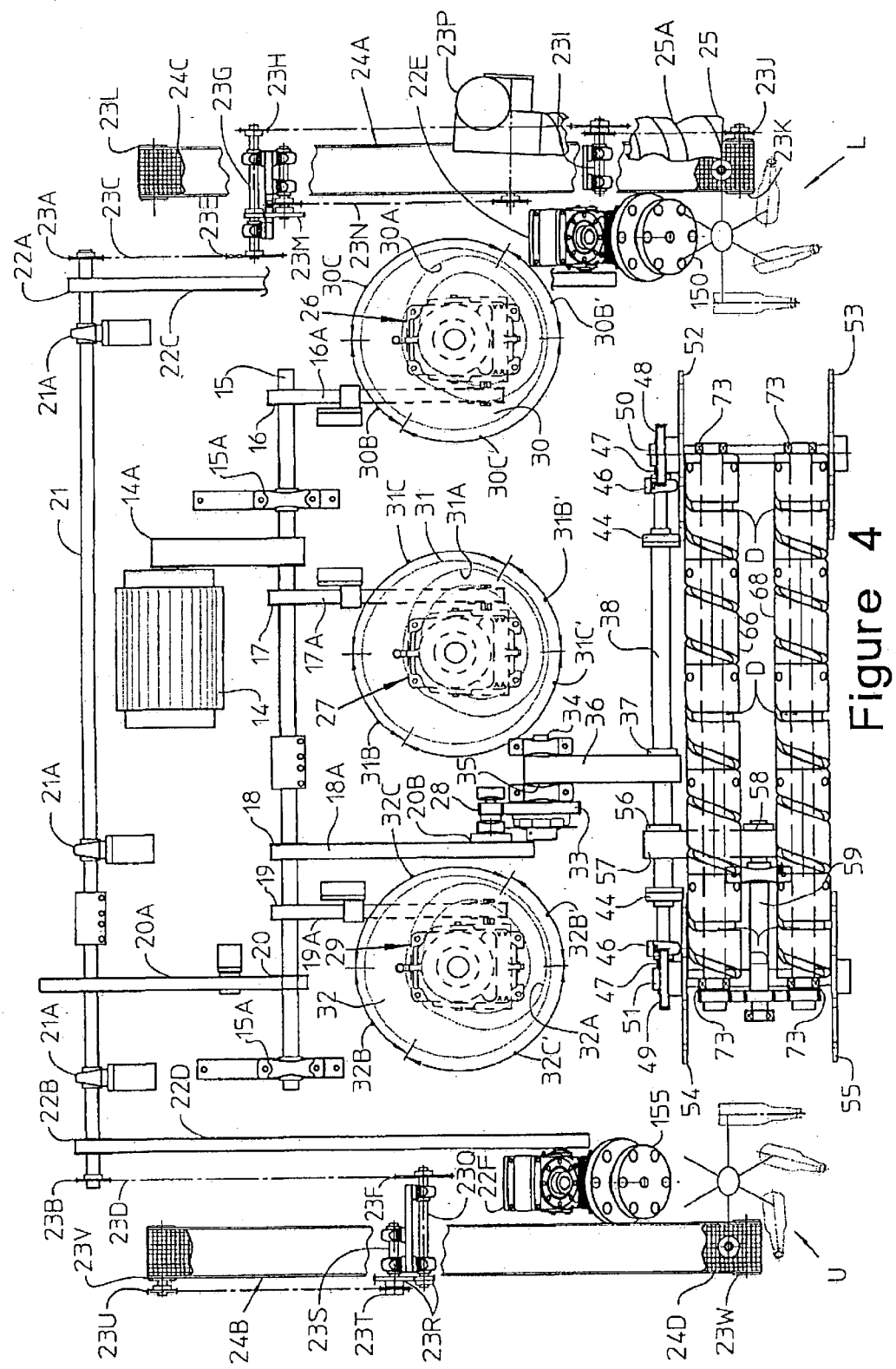
FIG. 4 is a schematic drive layout illustrating the major drive components comprising the decorating machine and the supply and delivery apparatus shown in FIG. 1.

The belts 16A, 17A and 19A extend to gear drives 26, 27 and 29, respectively, having output shafts secured to rotate cams 30, 31 and 32 (FIGS. 1, 3 and 4). The cams 30–32 are formed with closed cam tracks 30A, 31A and 32A also known as face grooves or positive cams. Bottles are decorated at each decorating station in an identical fashion by initiating screen travel when a bottle arrives at the decorating station. FIG. 4 illustrates the cam tracks 30A, 31A and 32A of the respective cams are each constructed to form two bottle decorating cycles each separated by a screen dwell cycle. More specifically, cam track 30A consists of a screen dwell cycle 30B, bottle decorating cycle 30C, screen dwell cycle 30B' and a bottle decorating cycle 30C'. Cam track 31A consists of a screen dwell cycle 31B, bottle decorating cycle 31C, screen dwell cycle 1B' and a bottle decorating cycle 31C'. Cam track 32A consists of a screen dwell cycle 32B, bottle decorating cycle 32C, screen dwell cycle 32B' and a bottle decorating cycle 32C'. In the first bottle decorating cycle, the decorating screens at each decorating station P1, P2 and P3 are linearly displaced in one direction during which decoration, is applied to a bottle at each decorating station. After these bottles are decorated, the screens remain stationary during screen dwell cycles and then the screens are reciprocated in the opposite direction during which decoration is applied to succeeding bottles at each decorating station. The cam tracks 30A, 31A and 32A define the precise occurrence of events with respect to the movement of the bottles by the workpiece conveyor 12 since the cams 30–32 and the workpiece conveyor are drivenly interconnected in the same drive train and driven by the same main drive motor 14. Each cam has a follower in the respective cam track to pivot an oscillating drive output at each of the decorating stations as will be discussed in greater detail hereinafter. The belt 18A driven by the first line shaft 15 extends to a pulley 20B mounted on a rotatably supported shaft having a gear 28 meshing with a gear 33. Gears 28 and 33 form a speed reduction relationship. Gear 33 is mounted on an intermediate shaft 34 supported by pillow blocks and having a pulley 35 provided with a belt 36 extending to a pulley 37 mounted on a third line shaft 38.

Figure 5:
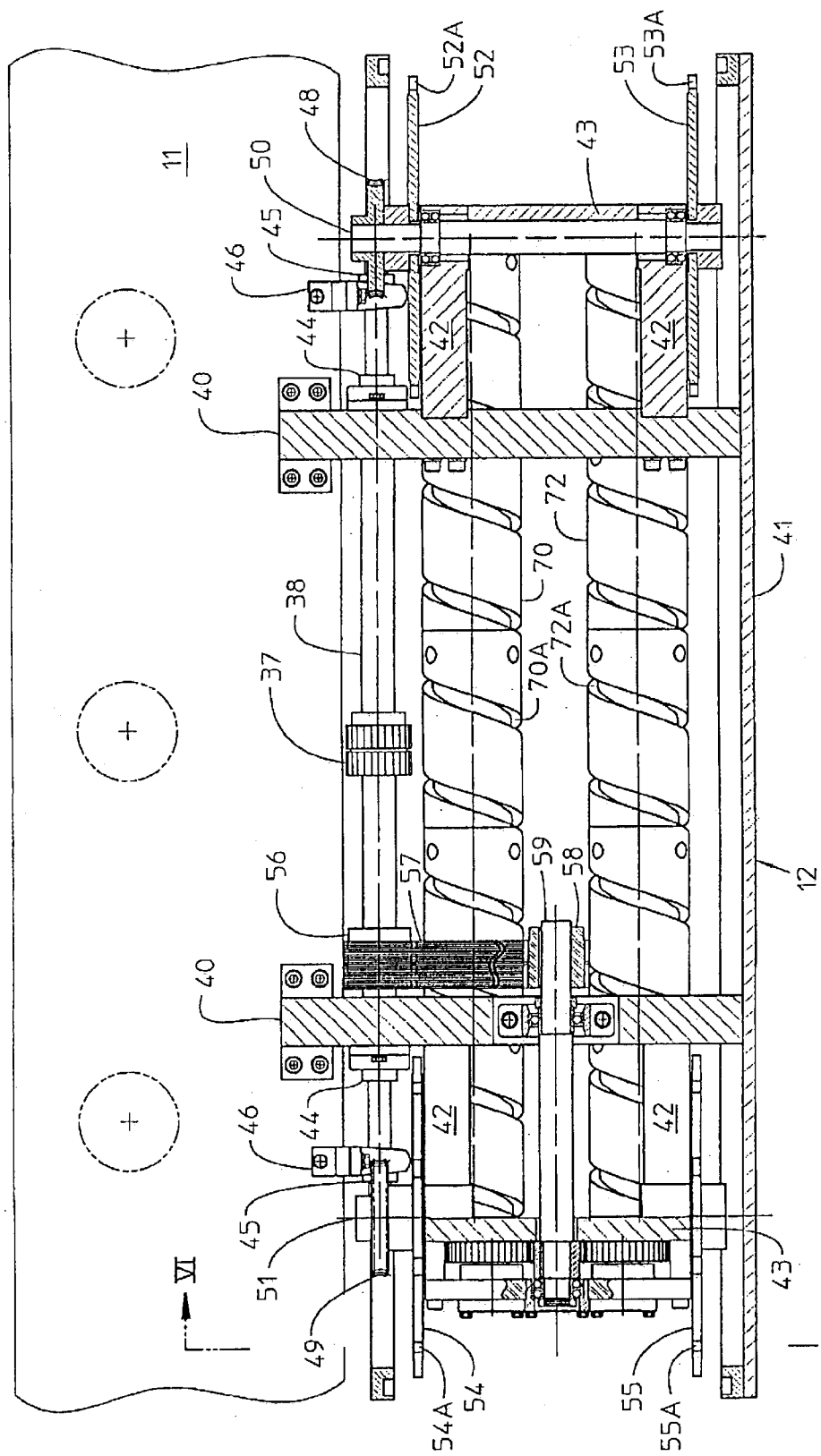
FIG. 5 is a plan view taken along lines V—V of FIG. 3.
Figure 6:
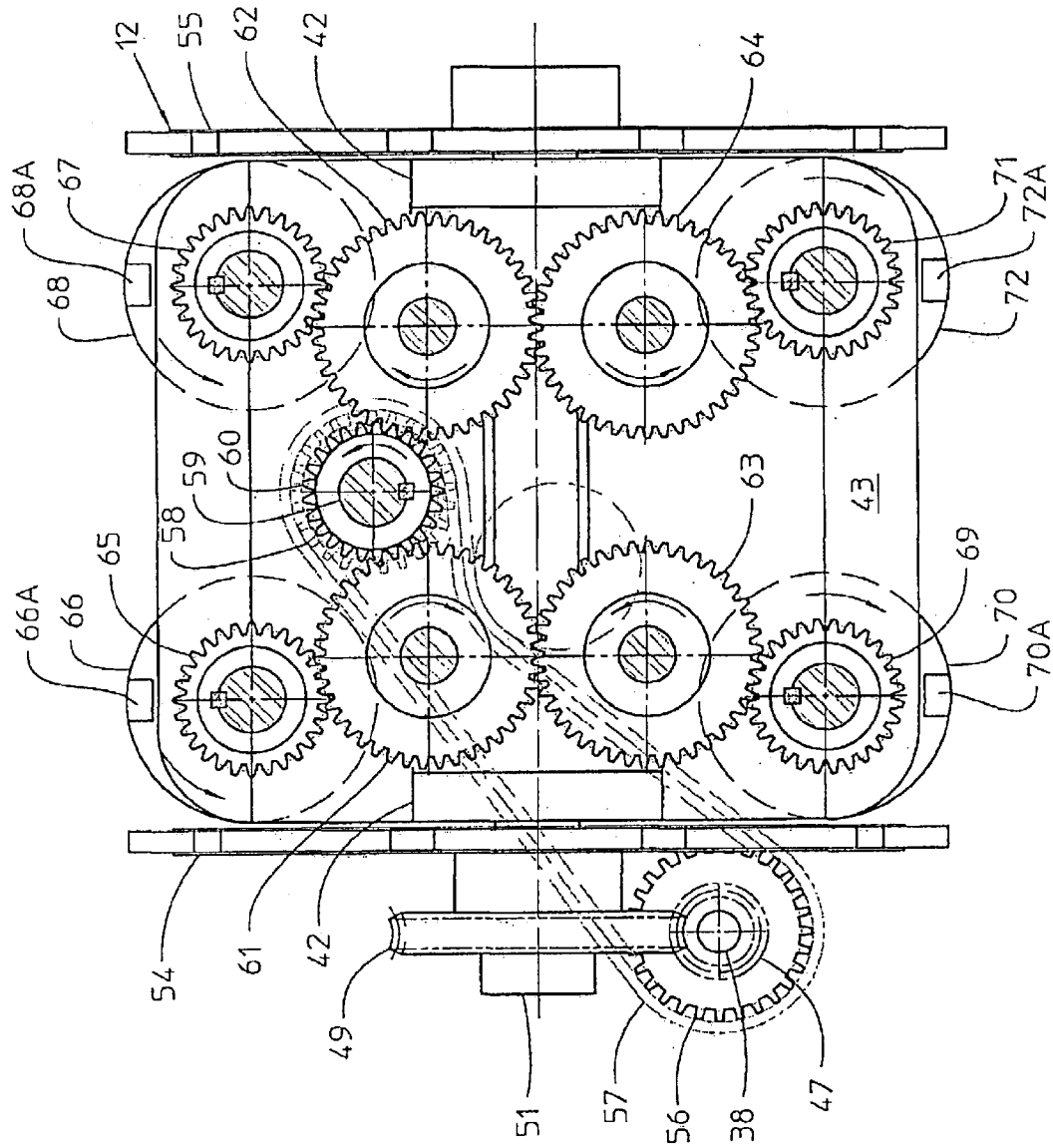
FIG. 6 is an enlarged end elevational view taken along lines VI—VI of FIG. 5.
Figure 7:
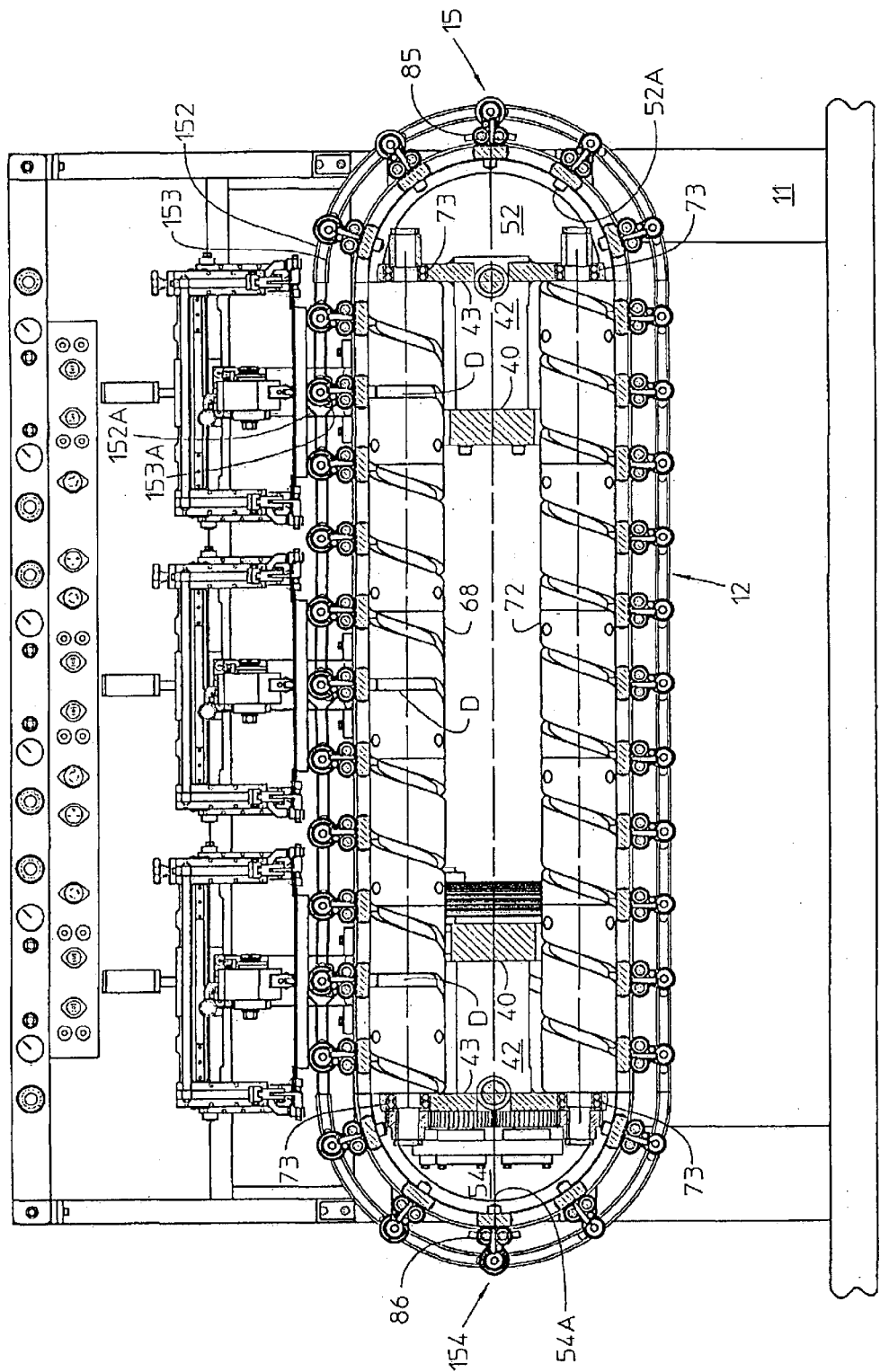
FIG. 7 is an elevational view in section taken along lines VII—VII of FIG. 1.

As shown in FIGS. 3, 5 and 7, line shaft 38 is rotatably supported by two spaced apart arms 40 extending from the base 11 in a cantilever fashion and secured by bolts to the base of the decorating machine. The outer most ends of the arms 40 are connected to an elongated cover plate 41. As shown in FIGS. 5, 6, 7 and 8, secured to each of the arms 40 are spaced apart spacers 42 that extend horizontally and outwardly in opposite directions from the arms 40. The outer ends of the spacers 42 carry vertically extending mounting plates 43 from which various drive gears project only at the unload end of the conveyor. As shown in FIGS. 4 and 5, the third line shaft 38 is rotatably supported by bearings 44 mounted on portions of the arms 40 adjacent the base 11 and latterly outwardly of each of the bearings 44 there is also a bearing assembly 45 mounted by a carrier bracket 46 to the base 11. The bearing assemblies 45 rotatably support the outer end portions of the third line shaft 38. As shown only in FIGS. 4 and 6, mounted on each of the terminal end portions outwardly of each bearing assembly 45 of the third line shaft 38 are worm gears 47. A worm gear 47 near the bottle loading equipment L meshes with a gear wheel 48 and the worm gear 47 at the unloading end of the decorating machine meshes with a gear wheel 49. The gear wheels 48 and 49 are mounted on drive shafts 50 and 51, respectively.

As best shown in FIGS. 3, 4 and 5, spaced apart carrier supply disks 52 and 53 are mounted on the inboard and outboard ends, respectively, of drive shaft 50 and spaced apart carrier return disks 54 and 55 are mounted on the inboard and outboard ends, respectively, of drive shaft 51. A pulley 56 is mounted on the third line shaft 38 and joined by a drive belt 57 to a pulley 58 mounted on a drive shaft 59 extending horizontally above the drive shaft 51. Tension in the drive belt 57 is controllably set by using fasteners to secure a roller support arm 57A, FIG. 3, rotatably supporting a slack adjusting roller 57B in a fixed position to arm 40 for establishing the position for roller 57B to impose a desired tension on belt 57. As shown in FIG. 6, a drive pinion gear 60 is mounted on the horizontally extended end of drive shaft 59 and meshes with idler gears 61 and 62 which in turn mesh with idler gears 63 and 64, respectively. Idler gear 61 meshes with a drive gear 65 mounted on a support shaft of a barrel cam 66; idler gear 62 meshes with a drive gear 67 mounted on a support shaft of a barrel cam 68; idler gear 63 meshes with a drive gear 69 mounted on a support shaft of a barrel cam 70; and idler gear 64 meshes with a drive gear 71 mounted on a support shaft of a barrel cam 72. As shown in FIGS. 4 and 7, the barrel cam 66, 68, 70 and 72 are rotatably supported by bearings 73 carried on the support shafts at opposite ends of the barrel cams. The bearings 73 are mounted in suitable apertures formed in the vertically extending mounting plates 43 such that the barrel cams can rotate about horizontal axes with the axes of barrel cams 66 and 68 lying in a common horizontal plane and there below the axes of rotation of barrel cams 70 and 72 lie in a common horizontal plane. Each of the barrel cams 66, 68, 70 and 72 have a closed cam track 66A, 68A, 70A and 72A which is a continuous groove milled in the cam body engaged by a roller attached to a follower for executing movements by workpiece carriers as will be described in greater detail hereinafter to provide continuous traveling motion until interrupted by a dwell period "D" provided for the printing operation.

As shown in FIGS. 8 and 12A–12C, the closed cam tracks 66A, 68A, 70A and 72A receive spaced apart roller parts of cam followers 74 and 75 mounted on each of a plurality of discrete and independently moveable bottle carriers 76. The details of the construction of the bottle carriers are best shown in FIGS. 12A–12C. Each bottle carrier is provided with a base cup 77 having a shallow support surface 77A surrounded by a protruding beveled edge to receive and center the base section of the bottle. A mouthpiece 78 has a shallow support surface 78A surrounded by a protruding beveled edge to receive and center the mouth of a bottle. Mouthpiece 78 is rotatably supported by neck chuck 79 having diverging support legs 79A and 79B. Leg 79A is selectively positionable along an actuator shaft 80 having teeth 81 for engaging a releasable latch to allow clamped positioning of the mouthpiece 78 relative to the base cup 77 at any of diverse sites to accommodate a particular height of a bottle between the base cup and mouthpiece. The actuator shaft 80 is slidably supported by spaced apart linear bearings 82 and 83 mounted on an elongated carrier plate 84. An actuator cam follower 80A is rotatably supported by an end portion of shaft 80 which protrudes from the bearing adjacent the base cup 77 for contact with cam surfaces 85 and 86 of actuator cams (FIG. 2) mounted on the base of the decorating machine at the entry and deliver ends thereof respectively. The cam surface 85 increases the distance separating the base cup 77 and the neck chuck 79 to allow loading of a bottle between the cup and chuck and similarly at the bottle unloading site the cam surface 86 again increases the distance separating the base cup and the neck chuck to allow removal of the bottle from the carrier. The neck chuck 79 is provided with a linear bearing 87 resiliently supported by a support shaft 88.

As shown in FIGS. 12A–12C extending from the base cup 77 is a journal 89 which is rotatably supported by a bearing in an upstanding housing 90. An end part of the journal 89 is bolted to a crank arm 91 extending perpendicular to the rotational axis of journal 89. The free end of arm 91 supports a drive roller 92 for rotating the base cup and a bottle at each of the decorating stations P1, P2 and P3. Laterally outwardly from the cam followers 74 and 75 there are mounting blocks 94A and 94B secured to the bottom surface of the carrier plate 84. The mounting blocks 94A and 94B support rotatable follower rollers 95A and 95B, respectively, which pass into engagement with horizontally aligned cavities 52A and 53A distributed about the outer peripheral edges of the supply disks 52 and 53 when cam followers 74 and 75 exit cam tracks 70A and 72A of the barrel cams 70 and 72. Similarly, the follower rollers 95A and 95B, respectively which pass into engagement with horizontally aligned cavities 54A and 55A distributed about the outer peripheral edges of carrier return disks 54 and 55 when cam followers exit cam tracks 66A and 68A of the barrel cams 66 and 68.

The bottle carriers are each sequentially transferred from an established positive driving relation with barrel cams 66 and 68 into a positive driving relation with carrier disks 54 and 55 and transferred by carrier disks 54 and 55 into a positive driving relation with barrel cams 70 and 72 and thence from barrel cams 70 and 72 to a positive driving relation with carrier disks 52 and 53 and completing a conveyance cycle transfer from carrier disks 52 and 53 into a positive driving relation with barrel cams 66 and 68. The cams to disks transfer is always the same and the transfer from disks to cams is always the same. The sequence of events for the transfer from disks to cams is the reversal of the sequence of events for the transfer from cams to disks. The bottle carrier transfer for one end of the bottle carrier is schematically shown in FIGS. 11A–11D for the disk 53 to barrel cam 68 via cam followers 95B and 75, and it is to be understood that the same relationship between disks 52, cam 66 and cam followers 74 and 95A at the end of the bottle carrier adjacent to the decorating machine.

Figures 11A, 11B, 11C, 11D:
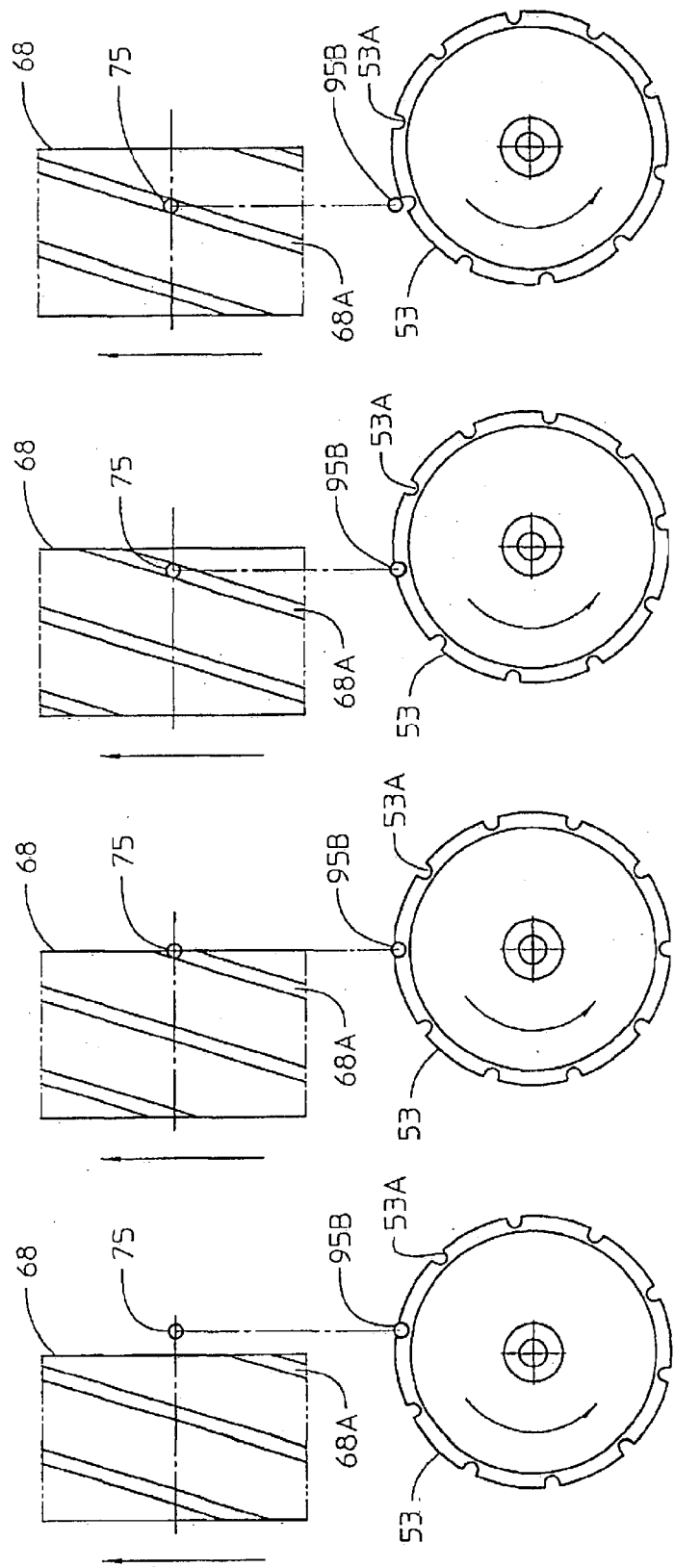
FIGS. 11A, 11B, 11C and 11D are displacement diagram views illustrating the timing sequence for the conveyance control of a bottle carrier during transfer from a transfer disk to a barrel cam.

In FIG. 11A, the cam follower 95B is seated in cavity 53A of disk 53 and cam follower 75 resides at the entrance of cam track 68A in barrel cam 68. As shown in FIG. 11B, as disk 53 rotates counter clockwise, follower 95B is carried in cavity 53A to a 12 o'clock position of disk 53 and the barrel cam 75 rotates in the direction indicated by an associated arrow bringing the cam track 68A into a position so that the site for entrance to cam track 68A is positioned for entry of follower 75. As shown in FIG. 11C, continued rotation of the disk 53 and barrel cam 68 drives the cam follower 75 into and along cam track 68A of the cam 68 by continued advancing movement of follower 95B in cavity 53A while at the same time the cavity 53A of disk 53 recedes from the cam follower 95B. The bottle carrier transfer is completed, as shown in FIG. 11D, when the disk wall defining cavity 53A of disk 53 passes out of contact with cam follower 95B and at the same time cam follower 75 advances along cam track 68A of barrel cam 68 as shown.

Figure 9:
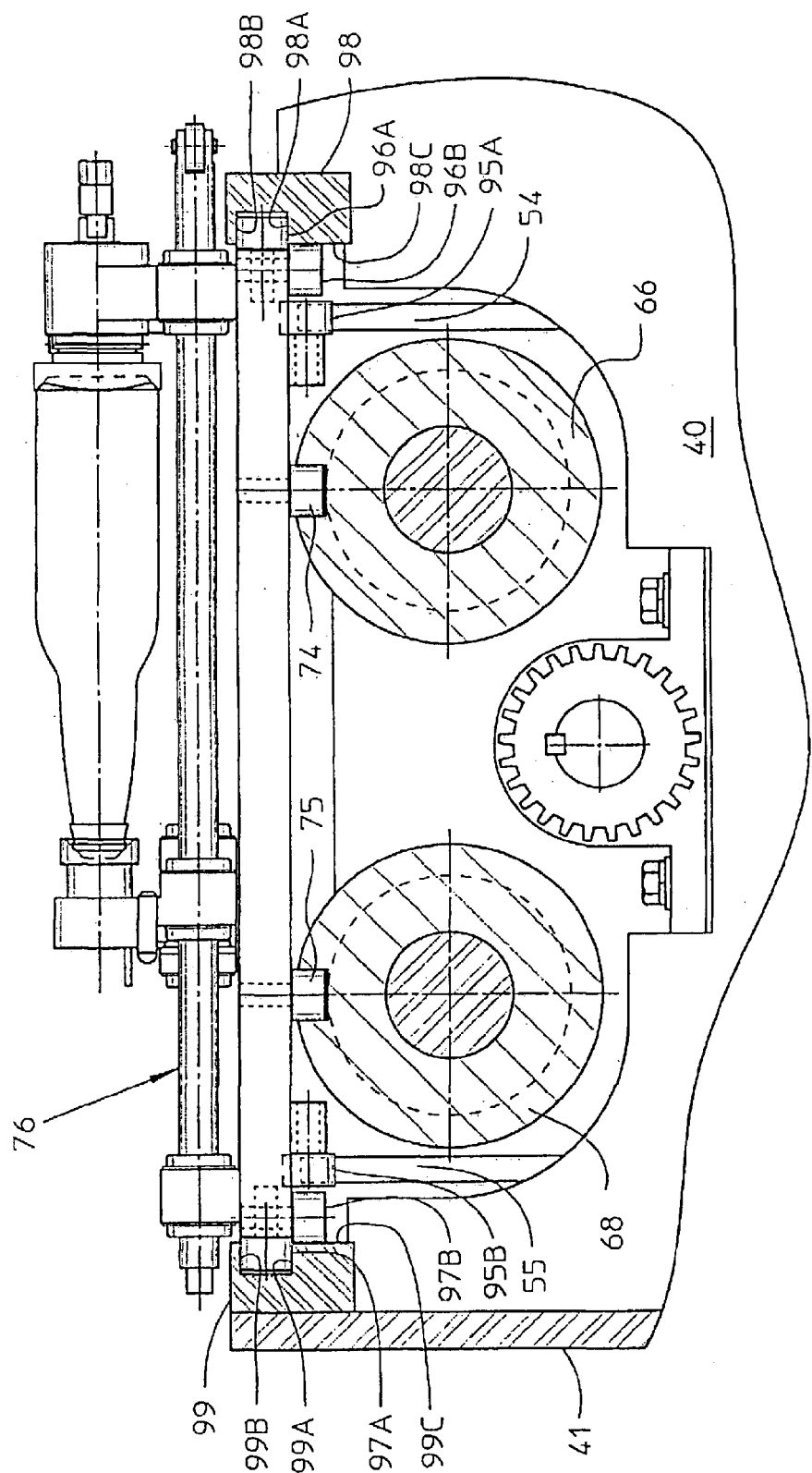
FIG. 9 is an enlarged view of the workpiece conveyance shown in FIG. 8.
Figure 10:
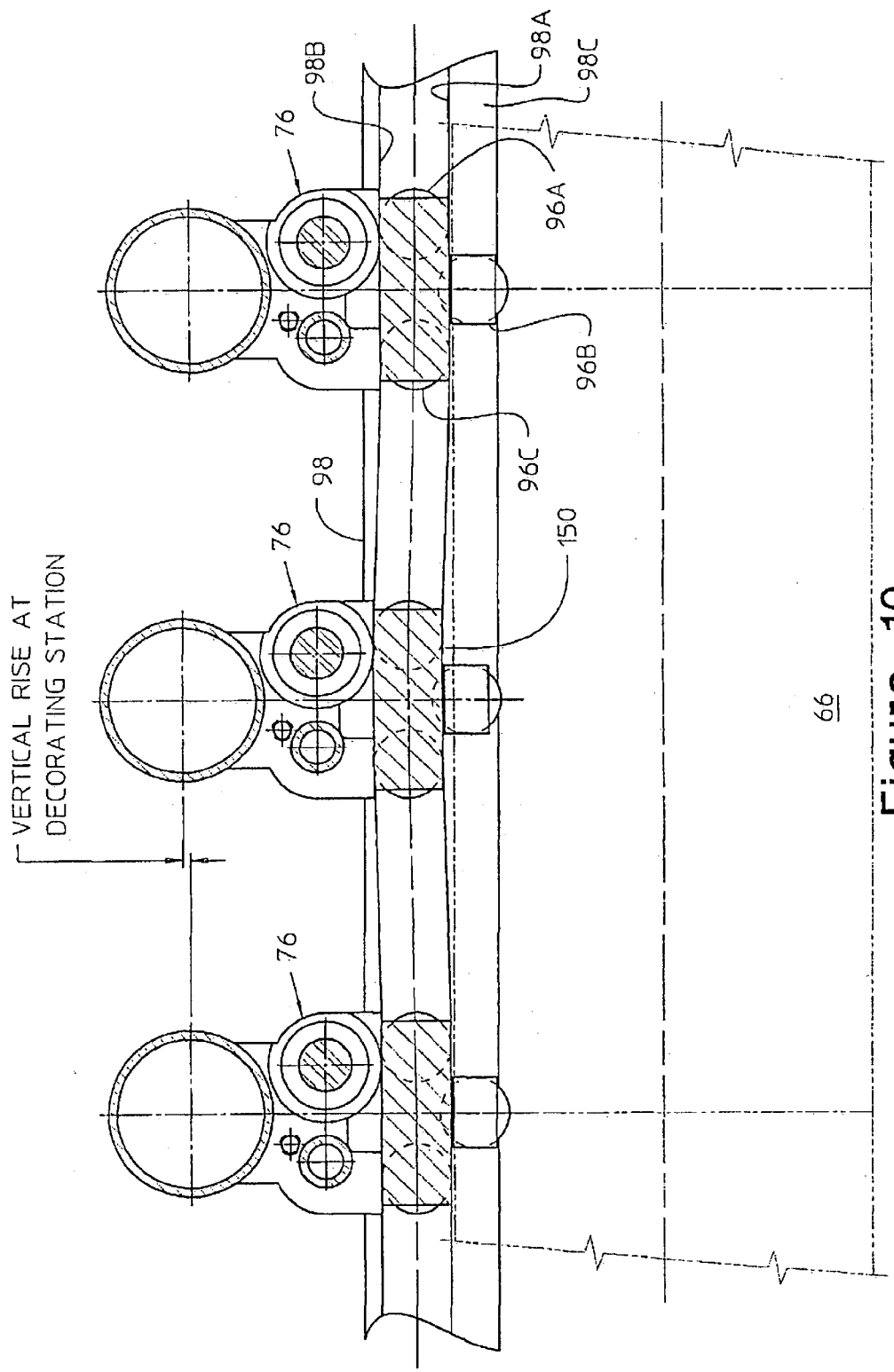
FIG. 10 is an enlarged elevation view in section at a decorating station taken along lines X—X of FIG. 8.

As shown in FIGS. 9, 10, 12B and 12C, a cluster of three spaced apart inboard guide rollers 96A, 96B and 96C are rotatably supported by the carrier plate 84 at its end most closely adjacent the decorating machine and a cluster of three spaced apart outer guide rollers 97A, 97B and 97C are rotatably supported by the carrier plate 84 at its end remote to the decorating machine. As best shown in FIGS. 9 and 10, secured to arms 40 extending from the decorating machine is an endless track plate 98 having a cavity wherein inboard guide rollers 96A and 96C engage opposed horizontal track surfaces 98A and 98B of the cavity. Guide roller 96B engages a vertical face surface 98C of the guide track. Secured to each of the arms 40 and plate 41 is an endless track plate 99 having a cavity wherein outer guide rollers 97A and 97C engage opposed horizontal track surfaces 99A and 99B of the cavity. Guide roller 97B engages a vertical face surface 99C of the guide track. The guidance provided by the cooperation between the guide rollers 96A, 96C, 97A and 97C which rotate about horizontal axes and the horizontal guide surfaces 98A, 98B, 99A and 99B provide load-bearing support for the carrier; maintain cam followers 74 and 75 engaged with the cam tracks of cam 66, 68, 70 and 72 and maintain the carrier in a stable orientation during movement along the cam track. Guide rollers 96B and 97B which rotate about vertical axes prevent unwanted displacement of the carrier between the guide tracks 98 and 99 in a longitudinal axis of a bottle when supported by the carrier.

Figure 8:
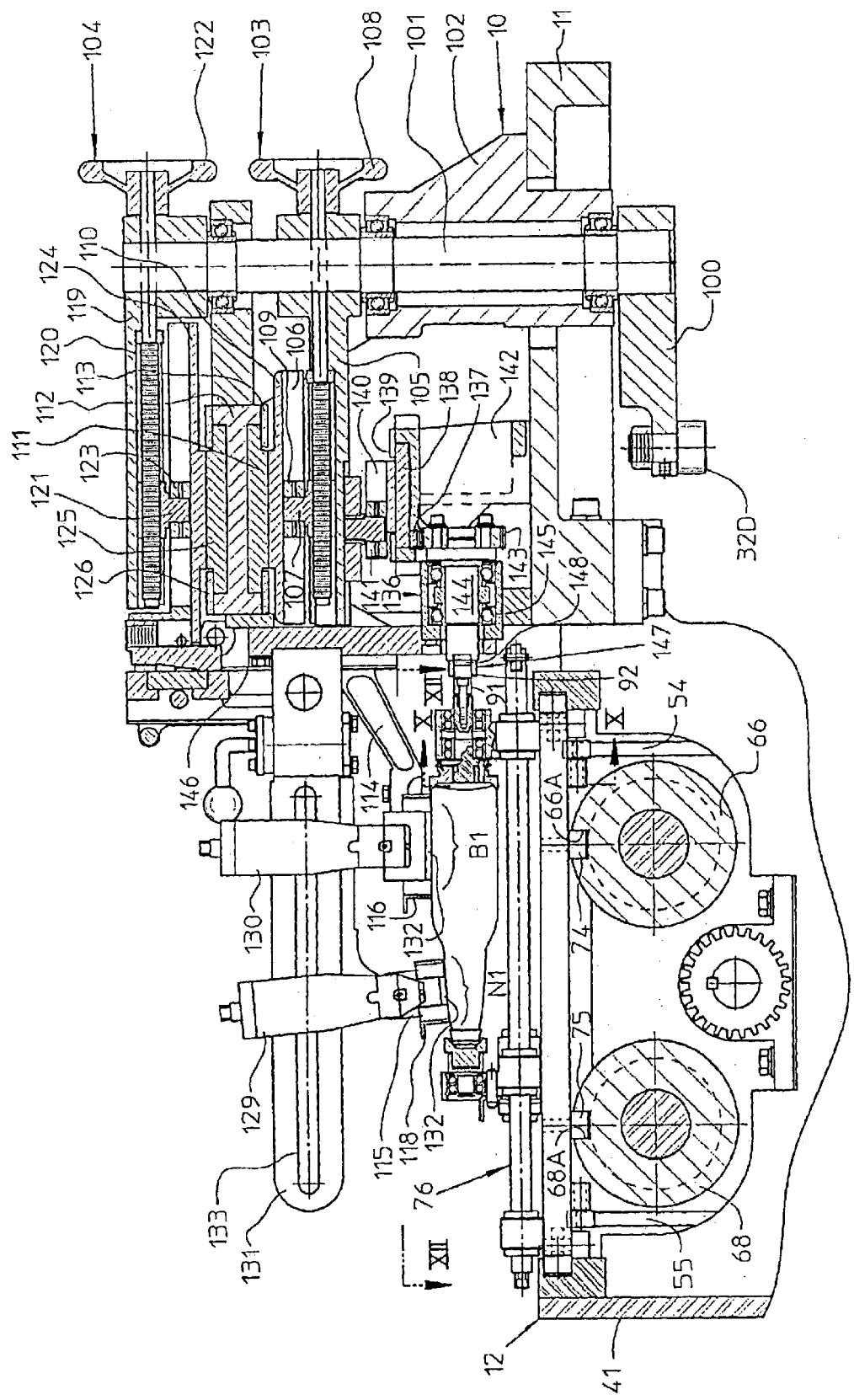
FIG. 8 is a fragmentary sectional view taken along lines VIII—VIII of FIG. 1.

At each decorating station P1, P2 and P3 the arrangement of apparatus is identical and station P3 is selected for the following description of the construction and operation. As shown in FIGS. 3, 4 and 8, the gear drive 29 connected to rotate the cam 32 so that cam track 32A moves a cam follower 32D which is mounted to a lever arm 100 which is in turn secured to the lower end of a vertical shaft 101. The shaft 101 is supported by spaced apart bearings, as shown in FIG. 8, which are in turn carried by a tubular column 102 supported by the base of the decorator machine 10. At the top of the column 102 there are superimposed oscillation arm assemblies 103 and 104. Assembly 103 is made up of a lever arm 105 secured to shaft 101 and provided with a guideway 106 extending radially of the shaft. In the guideway there is arranged a drive bar 107 which can be moved along the guideway by the threaded portion of a hand wheel 108. The distance the drive bar 107 is located radially of the rotational axis of shaft 101 is controlled by the hand wheel 108. A drive block 109 is mounted on a portion of the drive bar 107 projecting vertically above the guideway and reciprocates in an inverted "U" shaped slot formed in a drive bar 110. The drive bar is joined to a slide 111 supported in a guideway 112. The slide is held in a slot of guideway 112 by gib plates 113. While not shown, the slide 111 protrudes laterally from opposite sides of the tubular column 102 and is provided with outwardly spaced apart receiver arms 114 and 115. The receiver arm 114 engages a decorating screen assembly 116 that is reciprocated by the linear motion of the slide 111 to thereby reciprocate the decorating screen assembly along the body portion B1 of a bottle for carrying out decorating operations thereon. Assembly 104 includes a lever arm 119 secured to shaft 101 and provided with a guideway 120 extending radially of the shaft. In the guideway there is arranged a drive bar 121 which can be moved along the guideway by the threaded portion of a feed screw operated by a hand wheel 122. The distance the drive bar 121 is located radially of the rotational axis of shaft 101 is controlled by the hand wheel 122. A drive block 123 is mounted on a portion of the drive bar 121 projecting vertically downwardly from the guideway and reciprocates in a "U" shaped slot formed in a drive bar 124. The drive bar is joined to a slide 125 supported in a guideway 112. The slide 125 is held in a slot of guideway 112 by gib plates 126. The slide 125 protrudes laterally from opposite sides of the tubular column 102, in the same manner as slide 111 protrudes. Similarly, the receiver arm 115 engages a decorating screen assembly 118 that is reciprocated by the linear motion of the slide 125 to thereby reciprocate the decorating screen assembly along the neck portion N1 of a bottle for carrying out decorating operations thereon.

Hand wheels 108 and 122 are used to select a desired stroke for the screen reciprocation to match the circumferential distance of the bottle which is to be decorated. This matching relationship is critically significant because no relative motion between the screen movement and the bottle rotation can be accepted otherwise, smearing or poor quality decorating will occur. As shown in FIG. 8, squeegees 129 and 130 are carried by a support arm 131 in positions above the screens 116 and 118, respectively. Each squeegee includes a squeegee rubber 132 on the end portion of a squeegee positioning cylinder operated pneumatically against the force of a return spring thereby to establish line contact between the screen assembly 116 and 118 and a bottle as the bottle is rotated in a synchronous speed with linear movement of the screens. The squeegees are adjustably located by fasteners engaged in a mounting slot 133 extending along the elongated length of the support arm 131.

At each decorating station there is provided as part of the screen drives, a drive to rotate a rotator assembly 136. As shown in FIG. 8, the rotator assembly includes a drive gear 143 which is located beneath lower arm 105 where the teeth of gear 143 mesh with teeth of an elongated rack 137. Rack 137 is secured to a slide 138 arranged in a slideway supported by a pedestal 142. The slide 138 is constrained in a slideway by gibs 139 to reciprocate in response to a driving force imparted to a "U" shaped drive bar 140. The driving force is imparted by a drive block 141 mounted in a slot formed in the underside of lower arm 105. Drive block 141 serves to convert oscillating motion of lower arm 105 to linear motion of the slide thereby reciprocating the rack 137. The teeth of the rack 137 mesh with gear teeth of a drive gear 143 mounted on an end portion of an arbor 144 which is rotatably supported by a bearing 145, mounted in a bearing housing secured to a face plate 146 mounted on the base 11. A rotator drive head 147 is secured to the end portion of the arbor 144 and formed with a slot opening 148 extending transversely to the longitudinal axis about which the arbor 144 rotates. The slot opening receives the drive roller 92 on a bottle carrier 76 as the carrier approaches a dwell position "D" in the course of travel along the decorating machine. When the drive roller 92 is received in the opening 148, a driving relationship is established whereby rotation of the rotator head 147 rotates the drive roller 92 and the crank arm 91 for rotating the bottle 360° at the bottle decorating station.

As shown in FIG. 10, at each decorating station where a workpiece carrier is brought to a dwell period "D" interrupting its course of traveling motion there is an elongated riser section 150 representing an elevation increase to guide surfaces 98A and 98B of the guide 98. At the outboard side of the workpiece conveyor there is at each decorating station an elongated riser section, not shown, horizontally aligned with an identical elongated riser section 150 of guide 98 and representing an elevation increase to guide surfaces 99A and 99B of the guide 99 whereby each workpiece carrier arriving at a decorating station is acted upon simultaneously by a riser section at each of the opposite ends of the workpiece carrier. The riser sections elevate the bottle carrier and thus the bottle supported thereby a short distance so that the decorating screens can freely reciprocate in either direction without impingement contact with adjacent bottles.

The preferred embodiment of the present invention features a continuous motion of the bottles throughout conveyance by supply conveyor 24A; a bottle transfer 150; and the bottle carrier 76. In FIGS. 1, 2 and 4 the bottles are arranged in a spaced relation on the supply conveyor 24A with their axes A vertically orientated and changed to horizontal orientation by operation of a bottle transfer 150 forming part of the bottle loading equipment L. The bottle transfer 150 acquires support of each bottle with its axis A in a vertical orientation on supply conveyor 24A; reorientates the bottle in a manner so that its axis A is in a horizontal orientation; and when the axis A is horizontal or substantially horizontal release or otherwise allow engagement and support for the bottle between a base cup 77 and a neck chuck 79 of a bottle carrier 76 while passing through a loading station 151. The bottle carrier remains in the driving relation between followers 95A and 95B interfitting and drivenly engaged in aligned cavities 52A and 53A, respectively, of supply disks 52 and 53 to the registration station, not shown. An example of bottle registration is to provide a dwell position for a workpiece along the conveyor 12 where before the first decorating station P1 the bottle is rotated about its longitudinal axis A by a rotator head constructed in the same manner as rotator 147 and stopped from rotation when a registration finger engaged in the registration cavity formed in the lower base portion of the bottle. When rotation of the bottle is stopped there is established a predetermined bottle orientation with respect to the decorating screens.

The predetermined bottle orientation establishes a predetermined registration of the workpiece with respect to the decorating screens at each of the spaced apart decorating stations. The registration process is particularly useful to orient seam lines extending along opposite sides of a bottle with respect to the location of the desired area for decoration. As shown in FIGS. 7 and 8, registration of the bottle is concluded with the orientation of the crank arm 91 such that the drive roller 92 trails the advancing movement of the bottle carrier to the decorating stations. As the drive roller 92 emerges from a slot in the rotator drive at the indexing station, the drive roller 92 is captured and guided by spaced apart guide rails 152 and 153. These guide rails extend along an endless path of travel by the drive roller 92 throughout the endless circulating movement of the workpiece carriers to thereby control the orientation of the crank arm and maintain registration of the bottle at each decorating station. At each of the decorating stations P1, P2 and P3 the continuity of the guide rails 152 and 153 are interrupted by a gap wherein a drive rotator 147 member is located to receive and rotate a bottle. Downstream of each gap in the guide rails 152 and 153 are outwardly protruding collector rail portions 152A and 153A that return the roller and crank arm to the gap between guide rails as the barrel cams 66 and 68 operate advancing the bottles after completion of the decorating to an unloading station 154. According to the preferred embodiment of present invention, the unloading station 154 includes a bottle transfer 155 to acquire support of a bottle with its axis A in a horizontal orientation and located between the base cup 77 and the neck chuck 79 of a bottle carrier 76 while passing through the unloading station 154 by operation of the carrier disks 54 and 55. The bottle transfer 155 operates with continuous motion to reorientate the bottle in a manner so that its axis A is in a vertical orientation and when the axis A is vertical release the bottle to allow conveyance by the delivery conveyor 24B.

Figure 13:
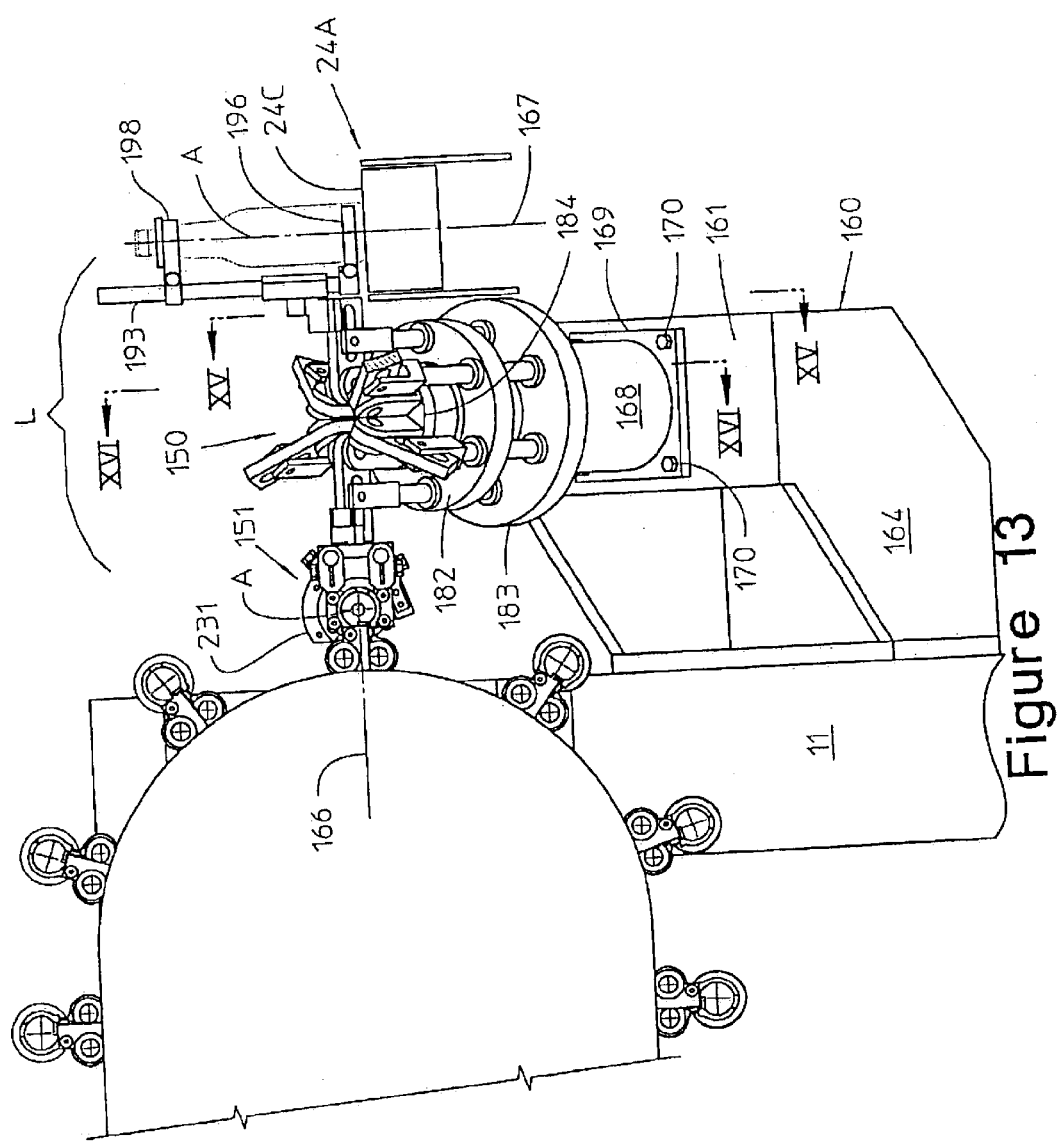
FIG. 13 is an elevational view of the bottle unloading equipment embodying the present invention.
Figure 14:
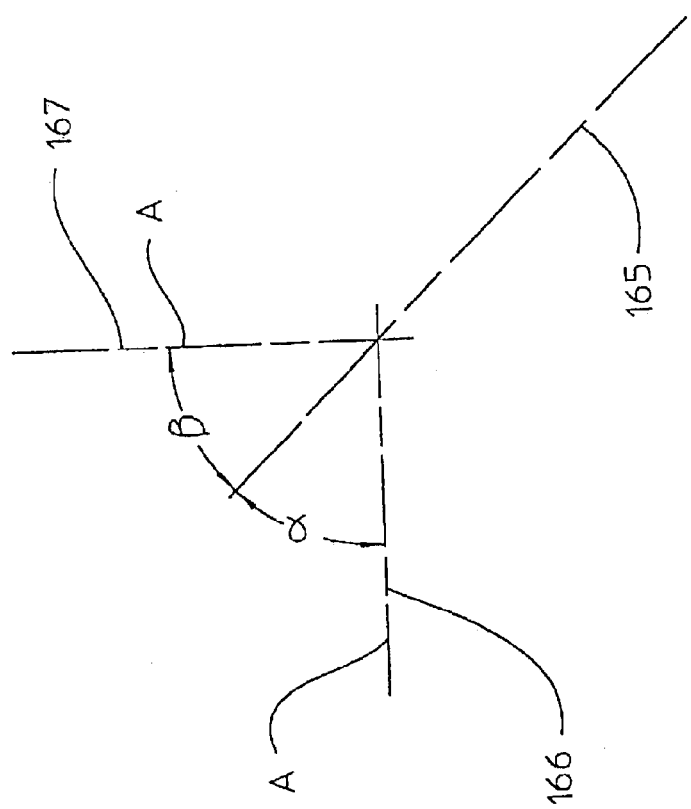
FIG. 14 is a geometric diagram illustrating the reorientation of a bottle from vertical to horizontal by operation of the loading/equipment shown in FIG. 13.
Figure 15:
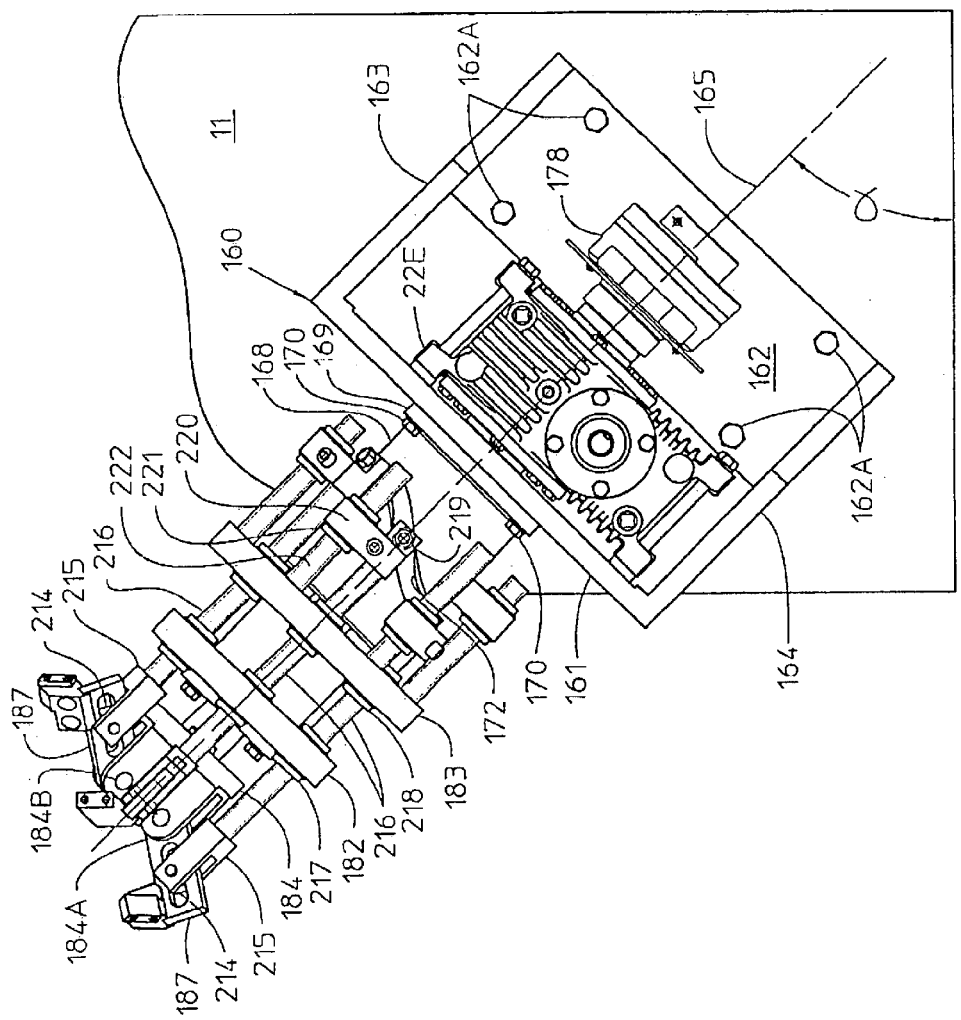
FIG. 15 is an end elevational view taken along lines XV—XV of FIG. 13.
Figure 16:
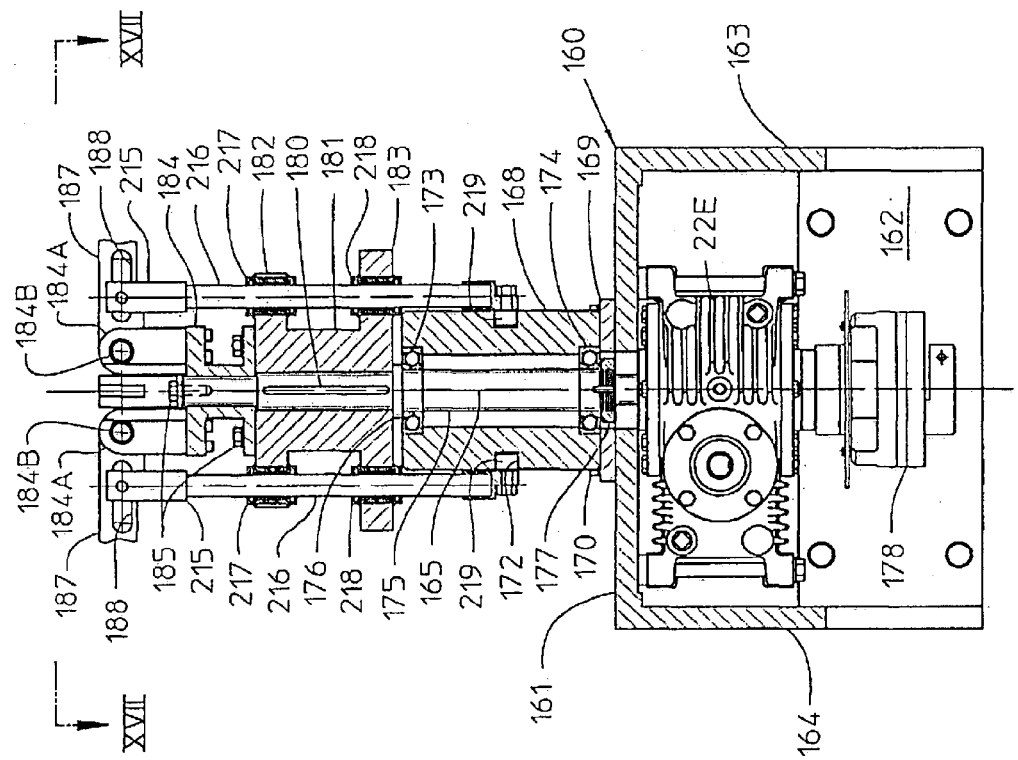
FIG. 16 is a sectional view taken along lines XVI—XVI of FIG. 13.

The bottle transfers 150 and 155, embodying the same construction of parts, are located at the opposite ends of the workpiece conveyor 12 for loading undecorated bottles on the bottle carriers 76 and unloading of decorated bottles from bottle carriers of the decorating machine. The following description of the construction of bottle transfer 150 is equally applicable to the bottle transfer 155 except as otherwise noted. As illustrated in FIGS. 13, 15 and 16, the bottle transfer 150 includes a rectangularly shaped pedestal 160 having a top wall 161 with one side wall 162 joined with two end walls 163 and 164. The side wall 162 is secured by bolts 162A to the base 11 at an angular orientation for rotational operation of the bottle transfer about an angularly orientated rotational axis 165 which as shown schematically by FIG. 14 forms an acute angle α with a horizontal plane 166 containing the axis A of a bottle when orientated for support by a bottle carrier 76 of the decorator conveyor 12 and forms an acute angle β with a vertical plane 167 containing the axis A of a bottle when orientated for support by either supply conveyor 24A or delivery conveyor 24B. The angular orientation of the rotational axis 165 is an important feature of the present invention that automatically brings about a change to the orientation of the axis A of a bottle from the vertical plane 167 to the horizontal plane 166 or when desired from the horizontal plane 166 to the vertical plane 167. The acute angles α and β are preferably each 45° which offers the advantage of allowing the feed and delivery conveyors 24A and 24B, to extend perpendicularly to the direction of bottle movement in the decorating machine and at opposite lateral sides of the decorating machine.

Figure 17:
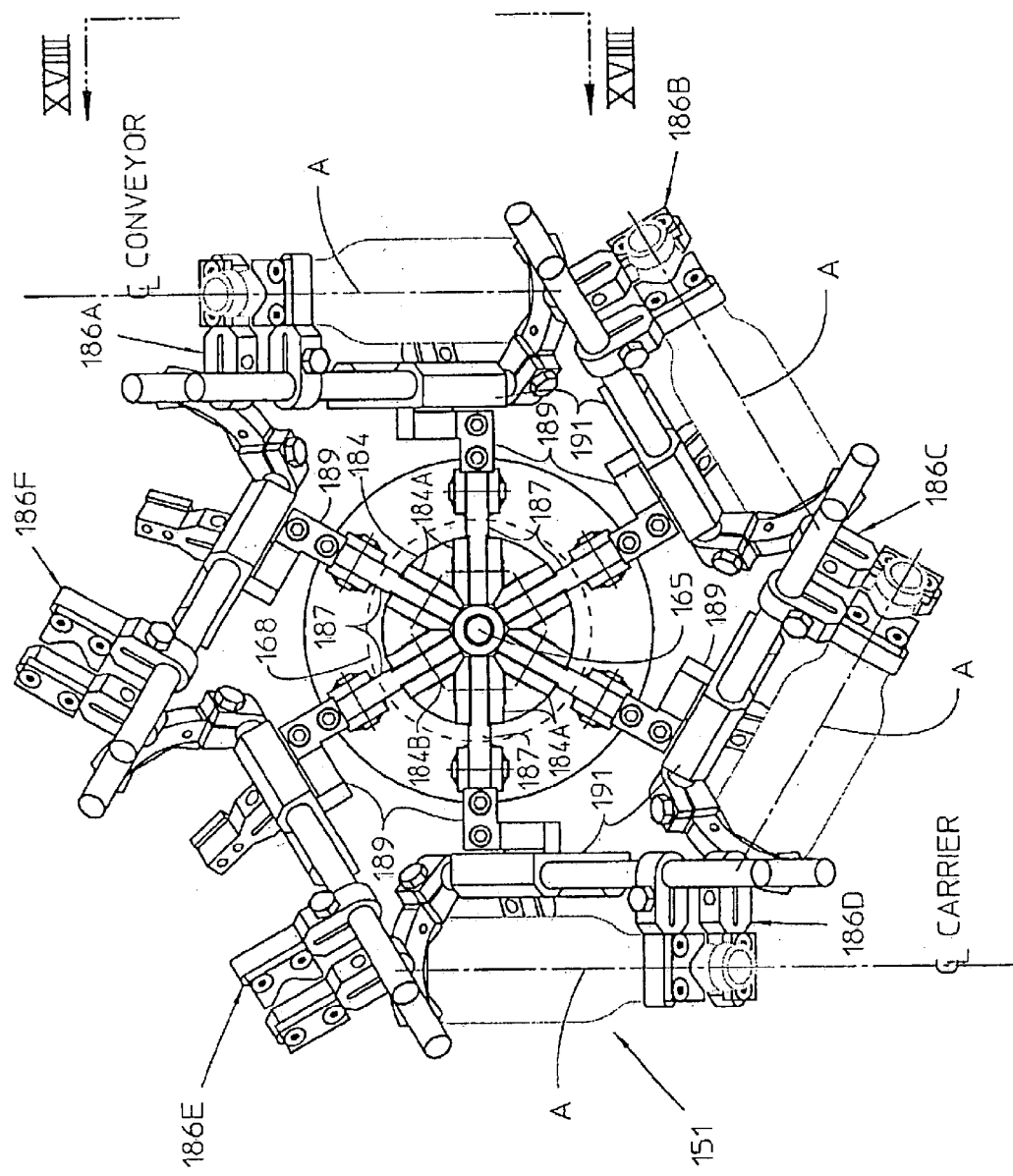
FIG. 17 is a plane view taken along lines XVII—XVII of FIG. 16.
Figure 21:
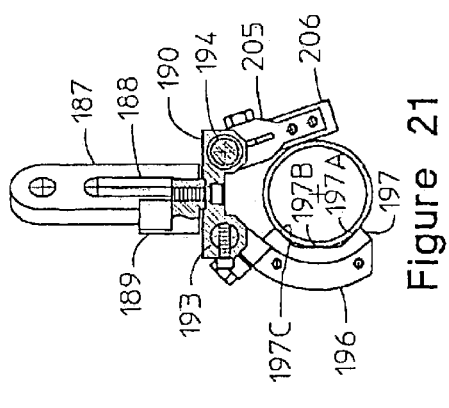
FIG. 21 is a sectional view taken along lines XXI—XXI of FIG. 19.
Figure 20:
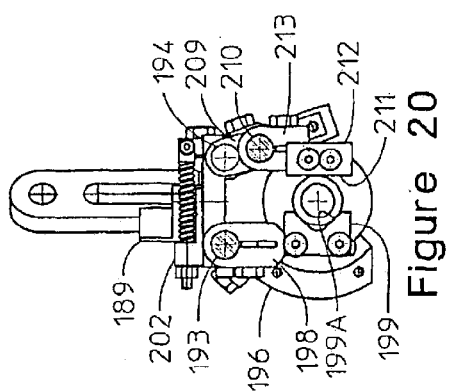
FIG. 20 is a sectional view taken along lines XX—XX of FIG. 19.
Figure 19:
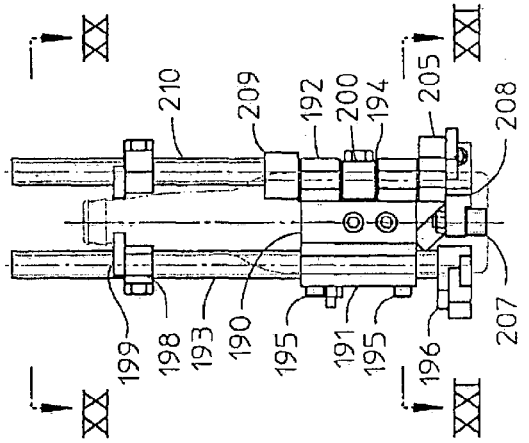
FIG. 19 is a rear elevational view of the bottle gripper shown in FIG. 18.
Figure 18:
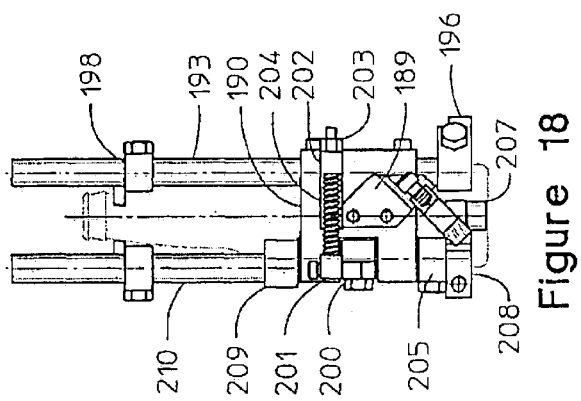
FIG. 18 is a front elevational view of a bottle gripper taken along lines XVIII—XVIII of FIG. 17.

The angular orientation of rotational axis 165 is established by using the top surface of top wall 161 to support a barrel cam 168 which is secured by a mounting flange 169 to the top wall 161 by the use of bolts 170. The barrel cam 168 has a closed cam track 172 and a hollow interior wherein bearings 173 and 174 are carried in spaced apart recesses and rotatably support a drive shaft 175 between a collar 176 and a threaded lock nut 177. The bearings 173 and 174 support the drive shaft 175 to rotate about an axis 165 in response to torque applied to the drive shaft through an overload clutch 178 connected to a drive output shaft of the cone worm drive 22E. The cone worm drive is supported by mounting bolts on the bottom surface of the top wall 161. As shown in FIG. 16, the drive shaft 175 includes a splined portion 180 projecting upwardly beyond collar 176 to which there is mounted a control rod carrier 181 having upper and lower flanges 182 and 183, respectively. A drive hub 184 is secured by a washer and bolt assemblies 185 to the drive shaft 175 and to the upper flange 182 of control rod carrier 181. The drive hub supports six, angularly spaced apart, bottle grippers 186A–186F (FIG. 17). It is preferred to utilize six grippers or more in pairs of grippers to reduce the rotational speed of the grippers about axis 165 between the bottle supply conveyor 24A and the workpiece conveyor 12 of the decorating machine and\or the workpiece conveyor 12 and the bottle delivery conveyor 24B. Six grippers are particularly suitable for inclusion in each of the bottle loading and unloading equipment L and U where the decorating machine operates at a bottle throughput rate of 200 bottles per minute or more. The grippers 186A–186F are identically constructed and supported by angularly spaced apart upstanding clevis 184A forming part of the drive hub 184. Each clevis is secured by a pivot shaft 184B to one of carrier arms 187 for pivotal movement in discrete planes that are parallel and intersect axis 165.

Bottle gripper 186A has been identified in FIGS. 18–21 for the purpose of describing the construction of each of the bottle grippers 186A–186F. The carrier arm 187 is elongated with a rectangular cross section containing a slot 188 elongated to extend in the direction of the extended length of the arm. Beyond the terminal projected end of the slot, the end of the arm 187 is secured by a mounting fixture 189 to a rectangular carriage 190 to project in opposite directions at an angle of 45° to the plane containing pivotal movement of the carrier arm 187 whereby the bottle gripper is vertically oriented at the supply conveyor 24A and horizontally orientated at the workpiece conveyor 12 while angularly rotated about axis 165. The carriage 190 is constructed with a tubular carrier section 191 extending along one lateral side opposite a bifurcated tubular carrying section 192 for supporting elongated gripper support rods 193 and 194, respectively. The gripper support rods 193 and 194 extend in a parallel and spaced apart relation with each other and with axis A of a bottle when supported by the bottle gripper. Moreover the axis A of a bottle when supported by the bottle gripper always forms an angle of 45° to the plane containing pivotal movement of the carrier arm 187. The gripper support rod 193 is rigidly secured by set screws 195 to the carrier section 191. On the lower terminal end portion of rod 193, there is mounted a C-shaped carrier arm 196 to which is mounted a wear-resistant insert 197 having angular surfaces 197A, 197B and 197C for engaging a hemispherical portion of the base of a bottle. The upper end of the rod 193, which is opposite the location of carrier arm 196, is secured to a carrier arm 198 provided with a wear resistant insert 199 having a V-shaped surface 199A to engage and support the neck portion of a bottle.

At the opposite side of the carriage 190, the rod 194 is pivotally supported by spaced apart bearings seated in the bifurcated parts of carrier section 192. On the lower terminal end portion of rod 194 there is rigidly mounted a pivotal carrier arm 205 provided with a wear-resistant insert 206 in an opposing relation, to the C-shaped carrier arm 196. The pivotal carrier arm 205 and wear-resistant insert 206 are pivotally displaced about a rotational axis extending centrally along the length of rod 194 in response to displacement by a cam follower 207 carried by a crank arm 208 secured to a lower terminal end portion of rod 194 beneath pivotal carrier arm 205. An upper terminal end portion of rod 194 protruding from carrier section 192 is rigidly secured by a link arm 209 to the lower end of a control rod 210 which extends parallel with the extended length of rod 194 at one lateral side defined by the length of link arm 209. The pivotal carrier arm 205 and link arm 209 also serve as retainer members to maintain the rod 194 pivotally engaged by the carrier section 192. The link arm 209 forms part of a geometric link for imparting pivotal movement by rod 194 to a generally planar support face 211 of a wear-resistant insert 212 on pivotal carrier arm 213 to engage and form a supporting relation for a neck portion of a bottle with the V-shaped surfaces 199A of support arm. 198. The pivotal movement of pivotal carrier arms 205 and 213 are biased in a direction for maintaining supporting engagement with a bottle the force for this bias is provided by using the attachment block 200 as a mounting structure for a control rod 201 having a threaded end portion extending through an aperture in a support lug 202 on carriage 190. The threaded end portion of rod 201 is engaged with a lock nut 203 which is adjustably positioned along the threaded end portion to apply a compressive force of a helical spring 204 surrounding the control rod 201 as the biasing force to pivotal carrier arms 205 and 213 when engaged with the bottle.

Referring again to FIGS. 15 and 16, the slot 188 in each of the carrier arms 187 of the grippers 186A–186F receives a slide bar 214 connected by a pivot to a clevis 215 on an upper end of an actuating rod 216 which is slidably supported by linear bearings 217 and 218 carried by each of the upper flange 182 and lower flange 183 respectively of the central rod carrier 181. The lower end of the actuating rod 216 is secured to a cam follower 219 residing in the closed cam track 172 of barrel cam 168. The course of travel by the cam follower 219 along the cam track 172 produces a literal reciprocating motion by the actuating rod 216 in a timed relation with rotation of the bottle gripper about the rotational axis 165. A control arm 220 is secured to the actuating rod 216 immediately above the site of cam follower 219 and carries a linear bearing 221 to guide the control arm 220 to reciprocate along a guide rod 222 supported by and extending downwardly from lower flange 183 and thereby prevent unwanted rotational movement of the actuating rod 216 about its axis extending in the direction of its extended length.

Figure 22:
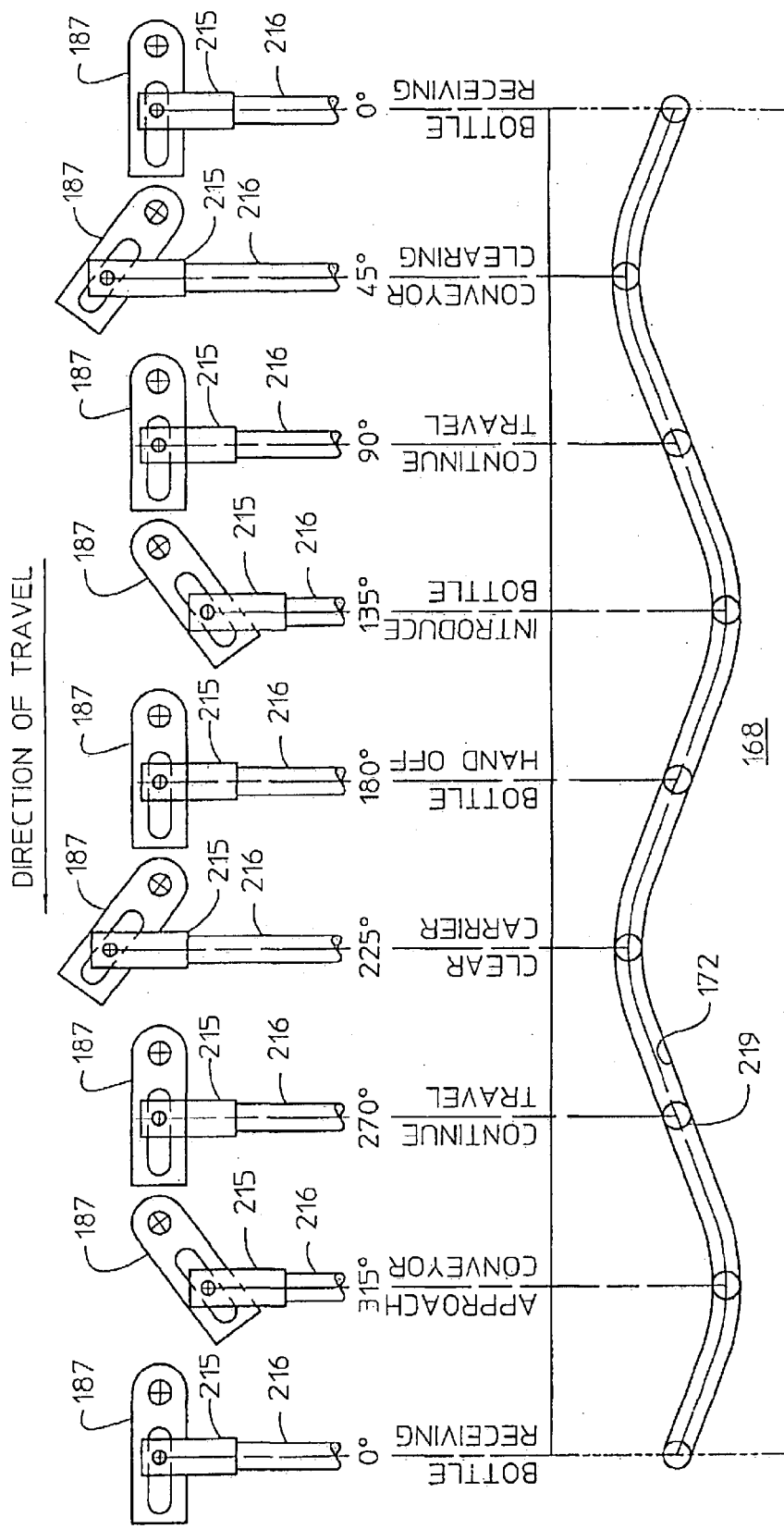
FIG. 22 diagrammatical illustrates the pivotal displacement of a bottle gripper by a cam drive.
Figure 25:
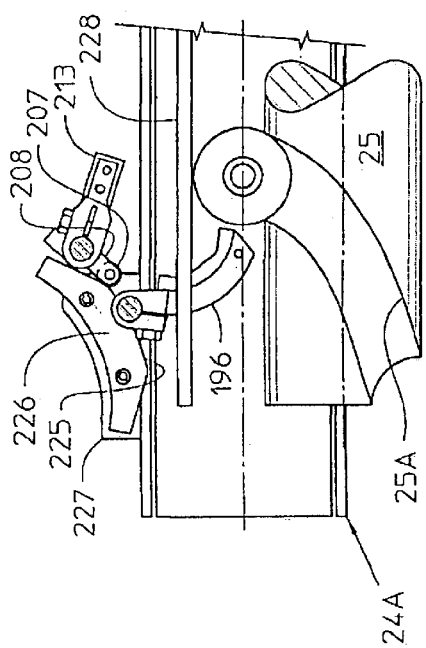
Figure 26:
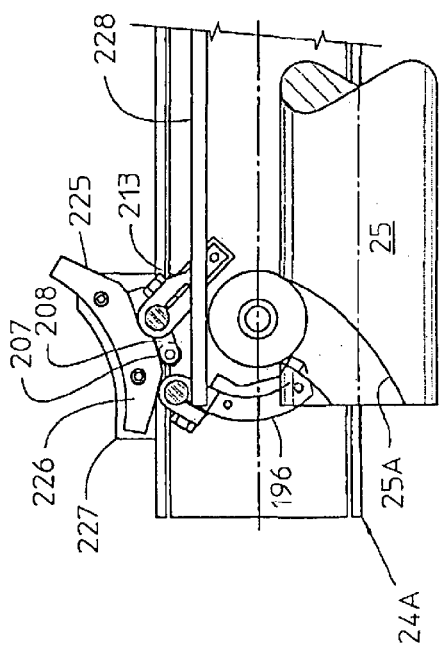

FIG. 22 diagrammatically illustrates the reciprocal movement of a gripper support arm 187 of gripper 186A which is the same as each cam follower 219 of the gripper support arms 187 proceeds along the same cam track 172 of the barrel cam 168. A BOTTLE RECEIVING position is identified by a 0° designation point on the barrel cam track 172 and established in the transfer cycle by the relation of the gripper support arm 187 extending at a horizontal position and midway between extreme upward and downward positions. In the BOTTLE RECEIVING position, the arm 187 extends in a horizontal plane that is perpendicular to the axis A of a bottle while supported on the supply conveyor 24A. The pivotal carrier arms 205 and 213 assume supporting engagement with a bottle when the cam follower 207 ceases contact with an arcuate cam surface 225 of a C-shaped cam 226 as shown in FIG. 26. The cam 226 is mounted on a shelf 227 extending horizontally at one lateral side of the conveyor 24A in the direction toward the bottle transfer 150. Immediately prior to the supporting engagement between the bottle and pivotal carrier arms 205 and 213, as shown in FIG. 25, the follower 207 advances along cam surface 225 which operates to maintain pivotal carrier arms 205 and 213 pivotally displaced outwardly in a direction away from the V-shaped surface 199A and the angular surfaces 197A, 197B and 197C, respectively. The delivery of a bottle to the site where supporting engagement is established with one of the bottle grippers 186A–186F is in a timed relation between advancing movement of a bottle by the conveyor 24A and the movement of a gripper to a vertical orientation by passing through a zone where a bottle is engaged and supported by the gripper. When alternative forms of supply and delivery conveyors extend along a lateral side or above the conveyance paths for the bottles such as described hereinbefore, the reciprocating motion imparted to the bottle grippers 186A–186F of the carrier arms 187 will facilitate the receiving and delivery of bottles with such alternative forms of supply and delivery conveyors.

Figure 23:
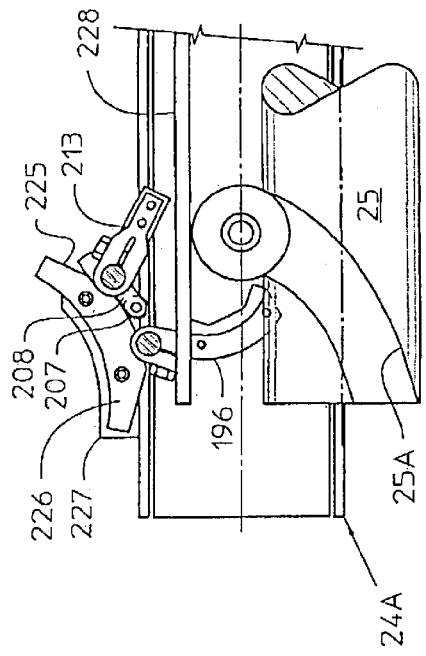
FIGS. 23–26 are illustrations of the sequence of the transfer of support of a bottle from a supply conveyor to a bottle transfer according to the present invention.
Figure 24:
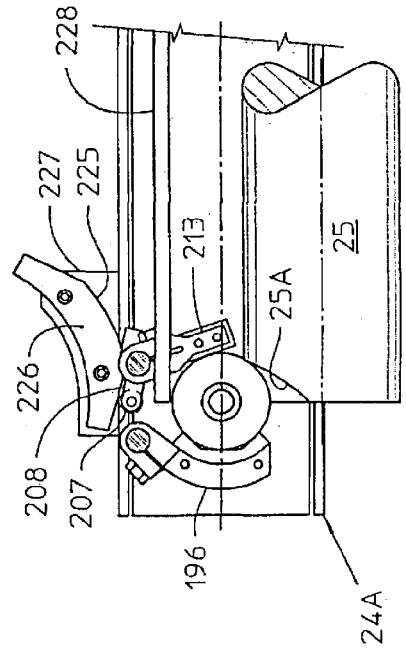

As shown in FIG. 23, the bottles are advanced along a horizontal guide rail 228 by the conveyor 24A initially with the bottles in an abutting relation until engagement is established with the timing screw 25 whereupon the helical groove 25A having an ever increasing pitch in the direction of advancing movement by the conveyor establishes a correspondingly ever increasing space between the bottles. The pivotal carrier arm 213 and C-shaped carrier arm 196 are shown in FIGS. 23–26, in their generally horizontal path of travel at the end portion of the timing screw. In FIG. 24, there is illustrated the carrier arm 196 advanced above the conveyor beyond the bottle undergoing restrained advancing movement by the timing screw and held captive by the timing screw and the guide rail 228. The pivotal carrier arm 213 resides at a lateral side of the conveyor while the cam follower 207 which is coupled by the pivot arm 208 to gripper support rod 194 approaches cam surface 225 of the C-shaped cam 226. In FIG. 25 the timing screw allows continued advancing movement of the bottle while the carrier arm 196 moves toward a central position along the conveyor 24A ahead of the bottle and the pivotal carrier arm 213 undergoes pivotal movement by engagement by the cam follower 207 with cam surface 225. Pivotal carrier arm 213 now trails the bottle at a location above the conveyor. In FIG. 25, the carrier arm 196 advances along the conveyor with pivotal motion that operates to orient angular surfaces 197A, 197B and 197C into a proximal confronting relation with the advancing bottle while still restrained by the timing screw. The relative movement between the carrier arm 196 and the bottle continues the advancing movement of the bottle toward the carrier arm as the follower 207 nears the trailing end portion of the cam surface 225 which serves to initiate pivotal movement of the pivotal carrier arm 213 toward the side of the bottle generally opposite the side of the carrier arm 196. As the cam follower 207 moves out of contact with cam surface 225, pivotal carrier arm 213 pivots into contact with the bottle. FIG. 26 illustrates the moment of release of a bottle from the timing screw and the simultaneous establishment of supporting engagement between carrier arm 196 and pivotal carrier arm 213 which is the BOTTLE RECEIVING position identified as a 0° designation point on the barrel cam track 172 forming part of the transfer cycle in FIG. 22.

As shown in FIG. 1 there is a segment of travel by a bottle gripper across a substantially vertical orientation zone 230 characterized by advancing movement of the bottle gripper in a substantially vertical orientation before and after the moment the bottle gripper engages the bottle with the axis A vertically orientated. As shown in FIG. 22 the CONVEYOR CLEARING segment of travel is part of a zone 230 where the axis A of a bottle remains substantially vertical and is produced as the cam follower 219 of a bottle gripper travels of along cam track 172 from 0° to 45° which maintains the gripper in a substantially vertical orientation and with advancing substantially horizontal movement across the terminal end portion of the conveyor 24A. Another part of the zone 230 is an APPROACH CONVEYOR segment occurring along can track 172 at about 45° prior to 0° by the bottle gripper movements causing a substantially vertical orientation of the bottle gripper before the moment when a bottle is engaged by the bottle gripper. The APPROACH CONVEYOR segment and the CONVEYOR CLEARING segment form the entire substantially vertical orientation zone 230. This course of travel by the bottle gripper is the result of rotary movement of the gripper about axis 165 and a pivotal displacement of the gripper by rod 216 in a vertically upward direction by the follower 219 movement along cam track 172. The bottle gripper enters the CONVEYOR ENTRY segment in a substantially vertical orientation due to the same rotary movement combined with the vertically downward movement produced by pivotal displacement of the gripper by rod 216 in a vertically downward direction by the follower 219 along cam track 172.

From 45° through 90° to 135° the bottle gripper is pivoted downwardly and then from 135° through 180° to 225° a bottle on the gripper is pivoted upwardly. These upward and downward pivotal motions of the gripper occur simultaneously with the rotary motion of the gripper about axis 165. The combined effect is a reorientation of the gripper whereby the axis A of a bottle supported by the gripper is changed from generally vertical orientation to a generally horizontal orientation. The reorientation is beneficially enhanced by the action produced by cam track 172 by providing that the bottle carrier moves across the bottle supply conveyor 24A with a continuous motion characterized by substantially matched speed and direction. This feature of the present invention enables the transfer of support for a bottle from the supply conveyor to the bottle gripper while the bottle remains in a stable orientation without a significant change to the take off speed by the bottle from the conveyor. In a similar fashion, the combined continuous motions of the bottle carrier approaching the 180° point along the cam track produce an approach by the bottle toward a bottle carrier 76 in a substantially horizontal orientation zone indicated by reference numeral 231 in FIG. 2. In the horizontal path the movement by bottle carrier slows to a stable horizontal orientation without a significant speed difference with the bottle carrier speed., At 180° the bottle is handed off for support by the decorator conveyor. The pivotal positioning of the gripper by operation of cam track 172 from 225° through 270° to 315° reorientates the bottle gripper for approach to the supply conveyor 24A along a substantially horizontal path of travel as indicated by reference numeral 231 in FIG. 2.

Figure 28:
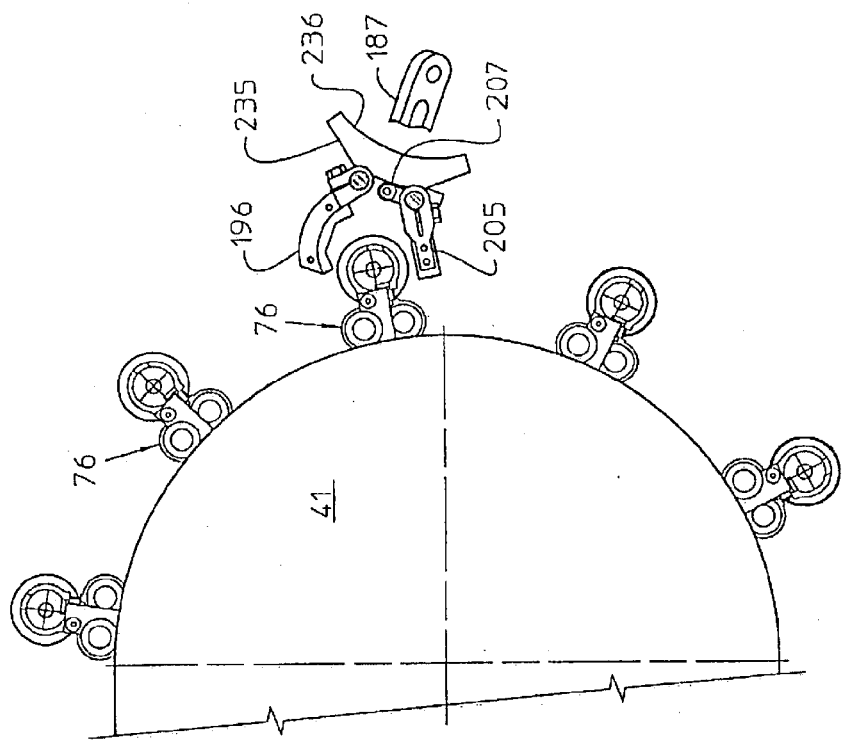
FIGS. 27 and 28 are elevational views to illustrate the transfer of a bottle from the bottle transfer to the workpiece conveyor.
Figure 27:
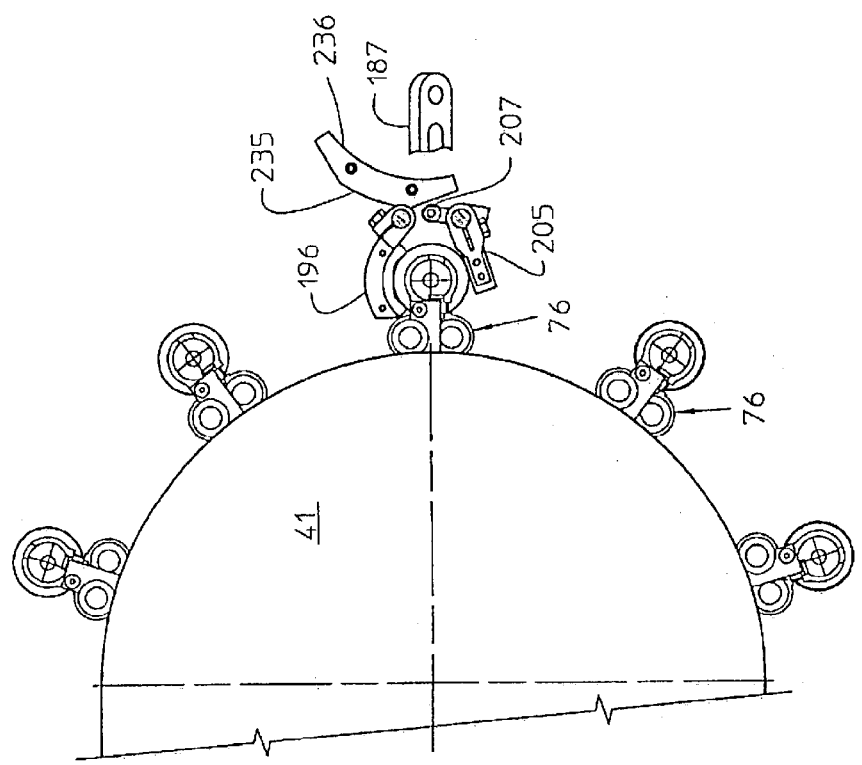

Concurrently with the passage of the bottle along the substantially horizontal path of travel 231, there is an increase to preset separation distance between the base cup 77 and mouthpiece 78 of a bottle carrier 76 by displacement of the actuator shaft 80 (FIGS. 12A and 12B) in response to contact between the actuator cam follower 80A and cam 85 as previously described as shown in FIGS. 2 and 7. As the mouthpiece 78 moves to clamp the bottle between the mouthpiece and the base cup in response to passage of the follower 80A beyond cam 85, the pivotal carrier arms 205 and 213 are displaced from supporting engagement with a bottle by contact of the cam follower 207 with an arcuate cam surface 235 of a C-shaped cam 236 as shown in FIGS. 27 and 28. The cam 236 is secured by a bracket to the base 11 of the decorating machine to strategically reside in the pathway of cam follower 207. As seen in FIG. 28 the cam surface 235 is engaged by the cam follower 207 when or at least immediately after the bottle is engaged and supported between the base cup 77 and mouthpiece 78 of a bottle carrier 76. The transfer of support occurs when the axis A of the bottle is horizontal and residing in horizontal plane 166 and thus completing the change to the reorientation of the bottle as shown in FIG. 14 from the vertical where the axis A is coextensive the vertical plane 167 to the horizontal where the axis A is coextensive with the horizontal plane 166. As the bottle is transported by the carrier 76, the pivotal carrier arms 205 and 213, as shown in FIG. 28 are maintained pivotally displaced outwardly in a direction away from their respective V-shaped surface 199A and angular surfaces 197A, 197B and 197C and thereby avoid interference with the moving carrier 76 and bottle supported thereby. The bottle transfer 155 at the bottle unloading equipment U utilizes the cam 236 with cam surface 235 oriented in the manner of an opposite hand arrangement to that as shown and described in regard to FIGS. 27 and 28. The opposite hand arrangement is characterized by positioning of the cam 236 along the path of travel by a bottle carrier at a site in advance of the bottle unloading station 154 which is to be compared with the positioning of cam 236 along the path of travel by a bottle carrier at a site after passage from the bottle loading station 151. At station 151 cam 236 functions to pivotally displace the pivotal carrier arms 205 and 213 in a direction away from grippers 196 and 198 before the bottle carrier arrives at the unloading station and thereby allow the grippers to pass along opposite sides of a bottle while supported by, a bottle carrier 76 approaching the bottle unloading station 154. Cam 86 operates to release the bottle at the unloading station at substantially the same time as cam follower 207 passes beyond cam surface 236 causing the pivotal carrier arms 205 and 213 to assume a supporting engagement with the bottle. The cam 226 supported by the shelf 227 along the side of delivery conveyor 24B operates to move the pivotal carrier arms 205 and 213 in a direction to release a bottle from support by the bottle transfer and conveyance by conveyor 24B. The release of the bottle from a bottle carrier for conveyance by delivery conveyor 24B occurs by arranging cam 226 along the side of the conveyor at a position so that the follower 207 engages cam surface 225 when the central axis A of a bottle is centrally disposed with respect to the width of the conveyor whereupon pivoting of the pivot carrier arm 205 and 213 allow the conveyor to advance the bottle away from gripper 196 while at the same time pivotal carrier arm 205 pivots away from the bottle.

Figure 29:
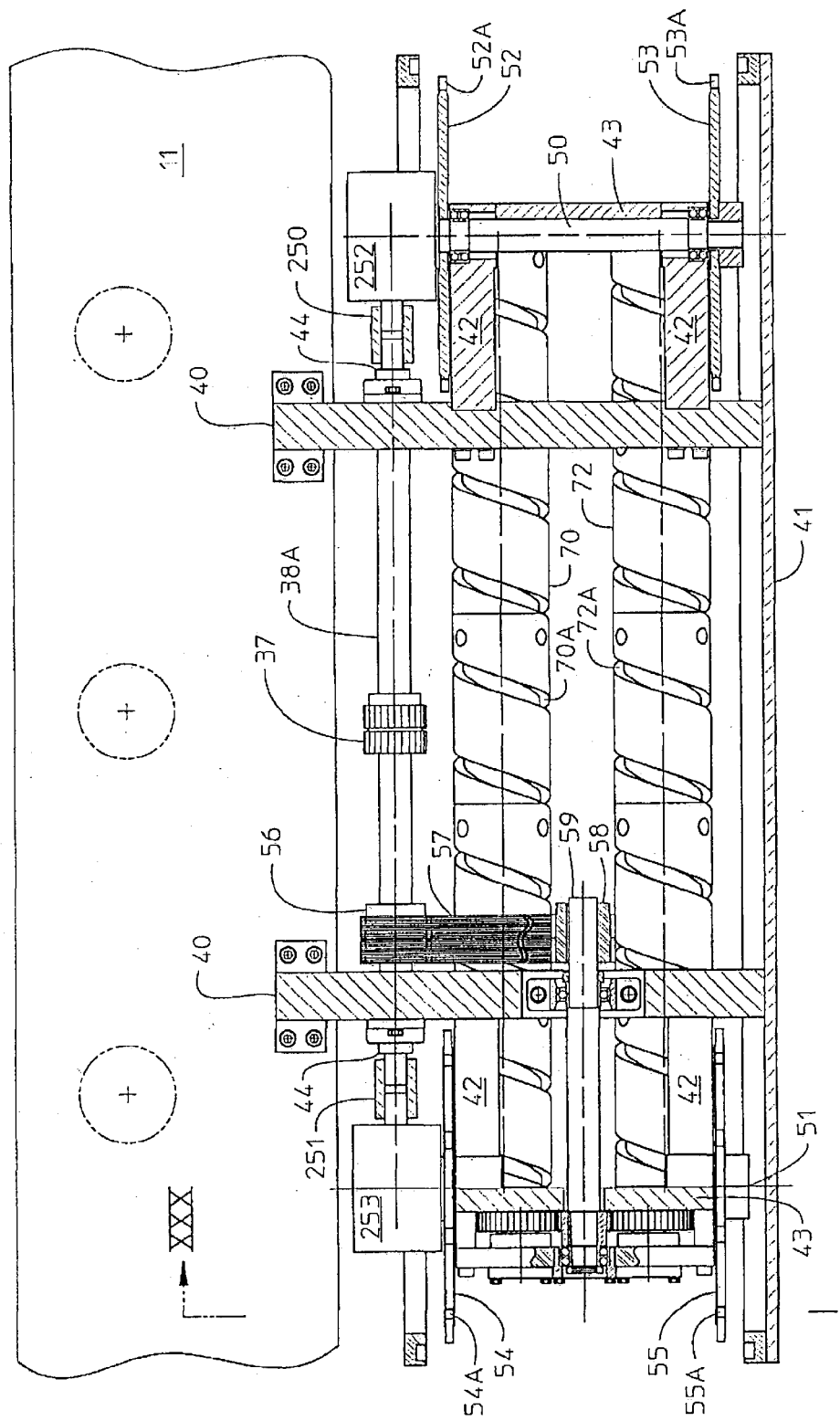
FIG. 29 is a plan view similar to FIG. 5 and illustrating a second embodiment of drive or imparting intermittent motion to the workpiece transfer disks independent of continuous rotation by the barrel cams.
Figure 30:
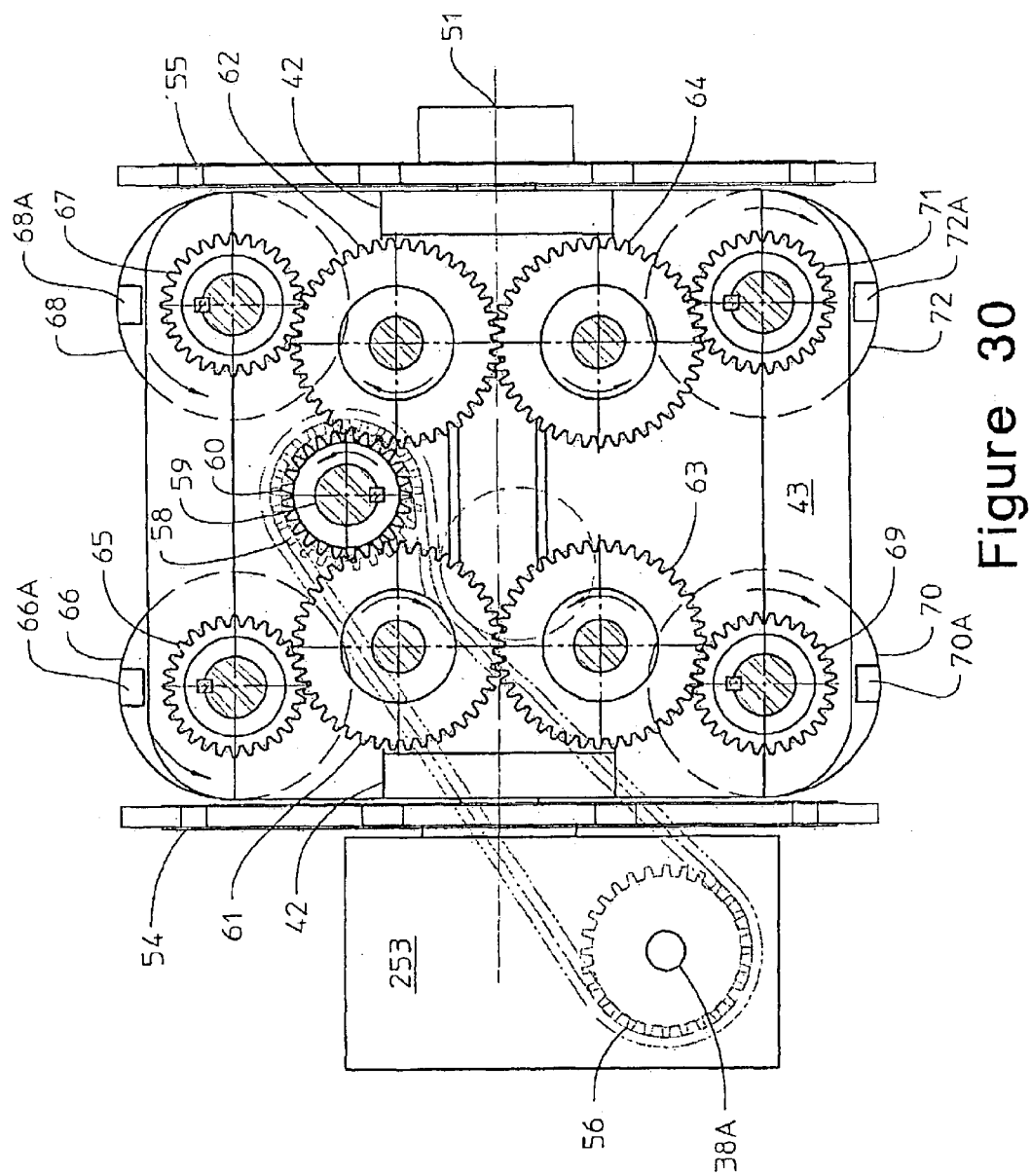
FIG. 30 is a sectional view taken along lines XXX—XXX of FIG. 29.

The bottle transfers 150 and 155 of the present invention are also useful for supplying and transferring of bottles to a workpiece conveyor of a decorating machine while the bottle transfer sites are stationary in a dwell period of intermittent advancing motion. FIGS. 29 and 30 illustrate a modification to the drive system for providing intermittent rotational movements to each of the carrier supply disks 52 and 53 and the carrier return disks 54 and 55. The description accompanying the use of reference numerals appearing in FIGS. 5 and 6 is equally applicable but not reproduced here in regard to the like numerals appearing in FIGS. 29 and 30. The pulley 37 is driven by a belt and mounted on a third line shaft 38A which is rotatably supported by bearings 44. Outwardly beyond the bearings 44, each end of the third line shaft 38A is joined by couplings 250 and 251 to index drive units 252 and 253, respectively. The index drive units have drive output shafts directly coupled to drive shafts 50 and 51, respectively. By this drive arrangement, the third line shaft delivers continuous rotary motion to belt 57 for continuously rotating the barrel cams 66, 68, 70 and 72 while the carrier supply disks 52 and 53 and the carrier return disks 54 and 55 are intermittently rotated in response to the operation of the index drive units 252 and 253. While not shown in the drawings, it is to be understood that the cone worm drives 22E for the bottle transfer 150 and the cone worm drive 22F for the bottle transfer 155 will be replaced by index drive units to execute dwell periods in a timed relation with the dwell periods formed by the index drive units 252 and 253. In this way as a bottle is supported by a gripper on conveyor 24A there will be a dwell period while support for a bottle occurs on a bottle carrier 76 at the loading station 151. Similarly, during the same dwell period support for a bottle occurs by a bottle gripper at unloading station 154 and a bottle is released for support by conveyor 24B by a bottle transfer.

Figure 31:
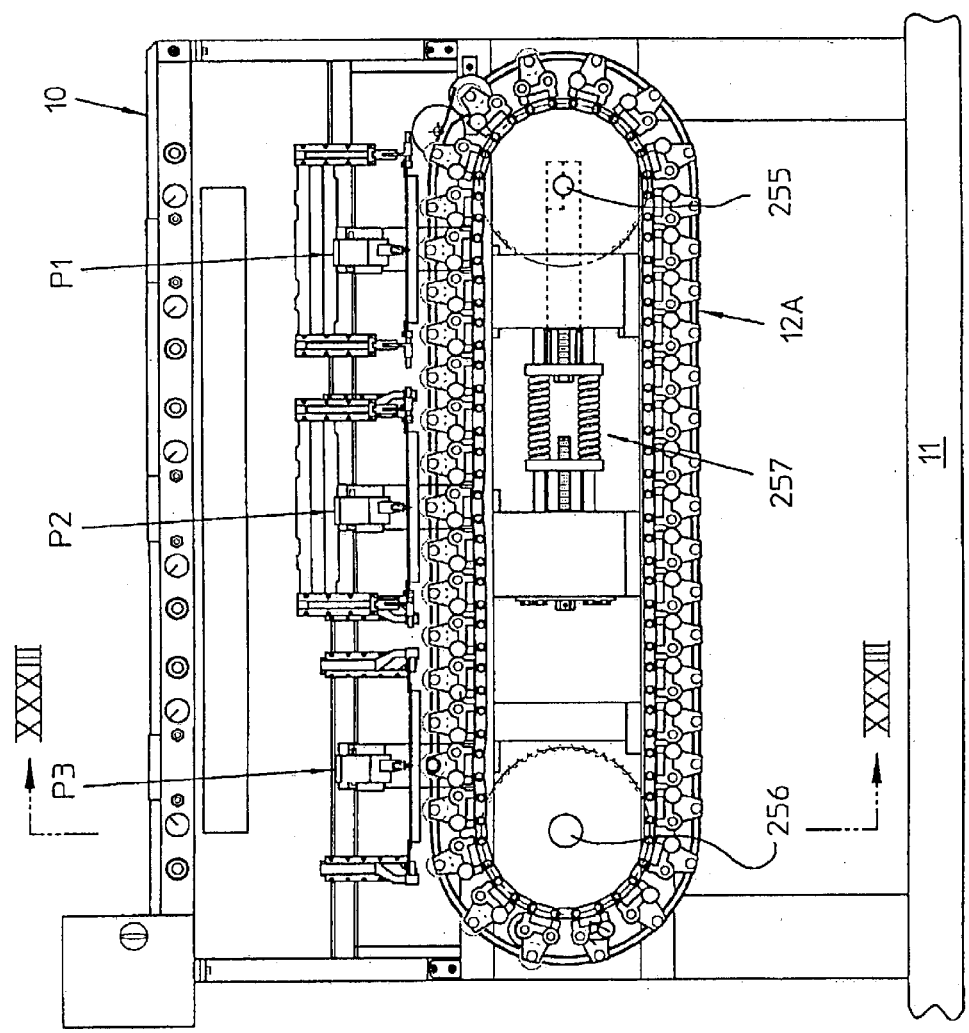
FIG. 31 is a front elevational view similar to FIG. 2 and illustrating a modified form of conveyor utilizing chains for intermittently advancing bottles along a decorating machine.
Figure 32:
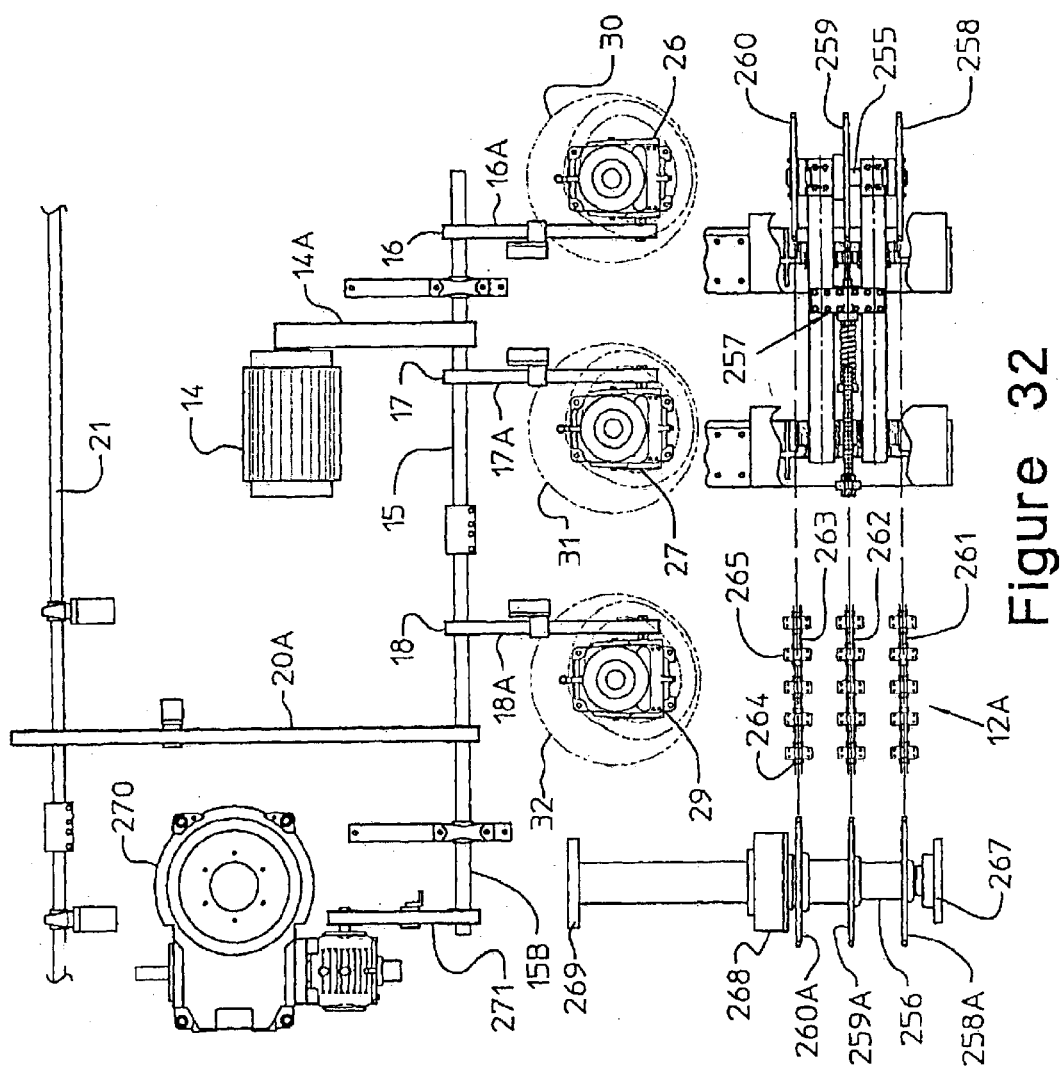
FIG. 32 is a schematic drive layout for the conveyor shown in FIG. 31.
Figure 33:
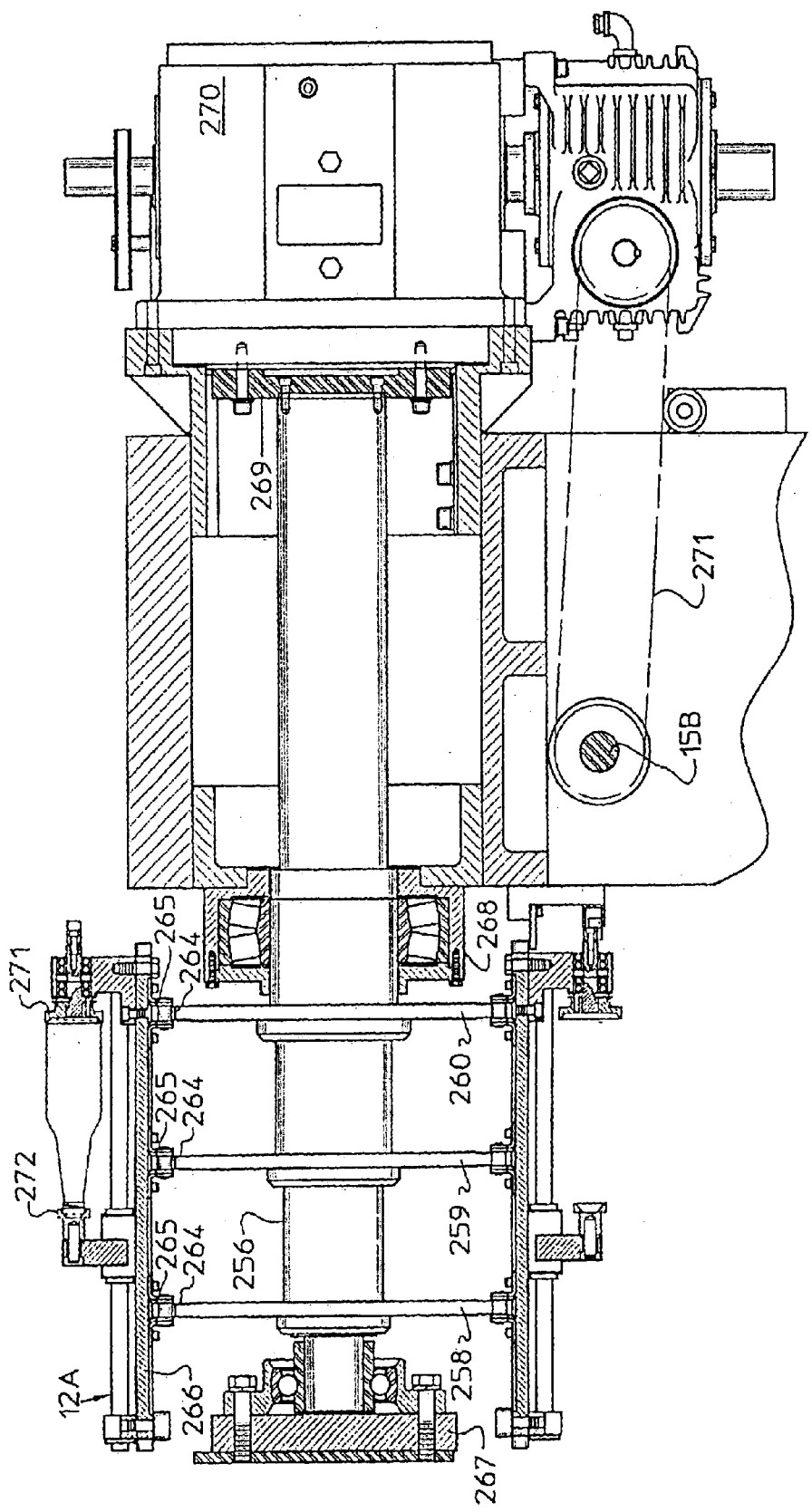
FIG. 33 is a sectional view taken along lines XXXIII—XXXIII.

FIGS. 31, 32, and 33 illustrate a further modified form of a workpiece conveyor for transporting workpieces in the decorating machine 10 by intermittent motion. The description of the decorating machine and the accompanying use of reference numerals appearing in the embodiment of FIGS. 1–8 are equally applicable but not reproduced herein in regard to the like numerals appearing in FIGS. 31–33. The workpiece conveyor 12A includes a support shaft 255 at the entry end of the conveyor and a drive shaft 256 at the delivery end of the conveyor. Support shaft 255 is supported by a spring tensioning assembly 257 carried by the base 11 to maintain a preselected tension applied by assembly 257 to the sprockets 258, 259 and 260 and then to the endless chains 261, 262 and 263. Drive shaft 256 is drivenly engaged with coaxially aligned and spaced apart drive sprockets 258A, 259A and 260A to drive the runs of endless chains 261, 262 and 263. Links 264 of the endless chains are interconnected by one of three lugs 265 protruding from the bottom of each carrier plate 266 of a plurality of workpiece carriers. Drive sprockets 258A, 259A and 260A are drivenly secured to drive shaft 256 and engage chains 261, 262 and 263 for driving the chains about an endless path of travel. The drive shaft 256 is rotatably supported by an outboard bearing support 267 mounted on a sidewall of base 11 and at the inboard side, the drive shaft 256 is supported by an inboard bearing support 268 mounted on a part of the base 11. Drive shaft 256 has an extended shaft portion extending beyond the inboard bearing support 268 to a drive output member 269 of a conveyor index box 270. As best shown in FIG. 33, the drive output member 269 of the index box imparts intermittent rotation to the shaft 256 which in turn imparts intermittent advancing motion to the workpiece carrier mounted on the conveyor 12A, thus intermittently advancing bottles along the decorating machine. The bottles are supported in a horizontal orientation between a base cup 271 and a mouthpiece 272 provided on each of the plurality of carrier plates 266 of workpiece carriers. The conveyor index box 270 is driven by a belt 271 connected to the second line shaft 15 by a pulley mounted on an extended end portion 15B of the shaft 15.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A workpiece transfer to load and unload workpieces for a decorating machine, said workpiece transfer including the combination of:

at least one workpiece gripper for supporting a workpiece during changing of the orientation thereof from a first orientation to a second orientation wherein a workpiece in said first orientation has a longitudinal central axis orientated in one of a vertical orientation and a horizontal orientation and in said second orientation has said longitudinal central axis in the other of said vertical orientation and horizontal orientation; and a drive to reciprocate said workpiece gripper and a workpiece gripped thereby generally parallel with a rotational axis while rotating said workpiece gripper and a workpiece gripped thereby about said rotational axis, said rotational axis forming acute angles with said longitudinal central axis of a workpiece in each of said vertical orientation and said horizontal orientation.

2. The workpiece transfer according to claim 1 further including a control including a pivot carried by said drive for pivoting said workpiece gripper to control receiving and delivery of a workpiece for each of said first orientation and said second orientation.

3. The workpiece transfer according to claim 2 wherein said control control includes an actuating rod slidably supported by said drive to pivot said workpiece gripper about said pivot in timed relation with rotation of said workpiece gripper about said rotational axis to orientate said workpiece gripper substantially vertical for travel to support a workpiece in said vertical orientation and to orientate said workpiece gripper substantially horizontal for travel to support a workpiece in said horizontal orientation.

4. The workpiece transfer according to claim 3 wherein said control further includes a stationary cam having a cam track engaged with a cam follower supported by said actuating rod and movable along said cam track by said drive.

5. The workpiece transfer according to claim 2 wherein each of said acute angles is 45°.

6. The workpiece transfer according to claim 5 further including conveyors for transporting a workpiece with longitudinal central axis thereof orientated in each of said vertical orientation and said horizontal orientation, and wherein said control includes a cam for pivoting said at least one workpiece gripper in a timed relation with rotary motion of said workpiece gripper by said drive for continuous motion of a workpiece in a substantially matched speed and direction of conveyance of a workpiece by each of said conveyors.

7. The workpiece transfer according to claim 1 wherein said drive includes a driven drive shaft rotatable about an axis defining said rotational axis, a hub secured for rotation by said drive shaft, said least one workpiece gripper including a plurality of workpiece grippers pivotally supported at angularly spaced apart sited by said drive hub.

8. The workpiece transfer according to claim 1 wherein said at least one workpiece gripper includes a support arm joined by a pivot for rotation about said rotational axis forming acute angles, a mounting fixture joining said support arm to a carriage containing spaced parallel rods each having grippers for supporting a workpiece between the grippers of each rod, said longitudinal central axis of a workpiece when supported by said grippers forming an acute angle with a plane containing pivotal movement by said support arm.

9. The workpiece transfer according to claim 8 further including at least one member retaining one rod of said spaced parallel rods for pivotal movement of grippers supported thereby into and out of engagement with a workpiece, a resilient member for pivotally urging said one rod in a direction for supporting a workpiece by said grippers, a cam follower joined by a crank arm to said one rod, and cams including cam surfaces to engage with said cam follower for pivoting grippers of said one rod in a direction away from supporting engagement with a workpiece for receiving and delivering a workpiece in each of said first orientation and said second orientation.

10. A workpiece transfer to load and unload workpieces for a decorating machine, said workpiece transfer including the combination of:
   a plurality of workpiece grippers pivotally supported at angularly spaced apart sites by a drive hub for supporting the workpieces during changing of the orientation thereof front a first orientation to a second orientation wherein a workpiece in said first orientation has a longitudinal central axis orientated in one of a vertical orientation and a horizontal orientation and in said second orientation has a longitudinal central axis in the other of said vertical orientation and said horizontal orientation;
   a drive secured to said drive hub for rotation of said workpiece grippers about a rotational axis forming acute angles with the longitudinal central axis of a workpiece in each of said vertical and horizontal orientations; and
   control rods for displacing said grippers generally parallel with said rotational axis to control receiving and delivery of workpieces when the longitudinal central axes thereof in at each of said first orientation and said second orientation.

11. The workpiece transfer according to claim 10 wherein each of said acute angles is 45°.

12. The workpiece transfer according to claim 11 further including conveyors for transporting a workpiece with longitudinal central axis thereof orientated in each of said vertical orientation and said horizontal orientation, and a cam for pivoting said at least one workpiece gripper in a timed relation with rotary motion or said workpiece gripper by said drive for continuous motion of a workpiece in a substantially matched speed and direction of conveyance of a workpiece by each of said conveyors.

13. The workpiece transfer according to claim 10 wherein said control rods further includes an actuating rod slidably supported by said drive to pivot said workpiece gripper about said pivot in timed relation with rotation of said workpiece gripper about said rotational axis to orientate said workpiece gripper substantially vertical for travel to support a workpiece in said vertical orientation and to orientate said workpiece gripper substantially horizontal for travel to support a workpiece in said horizontal orientation.

14. The workpiece transfer according to claim 13 further including a stationary cam having a cam track engaged with a cam follower supported by said actuating rod and movable along said cam track by said drive.

15. The workpiece transfer according claim 10 wherein said plurality workpiece grippers each include a support arm joined by said pivot for rotation about said rotational axis forming acute angles, a mounting fixture joining said support arm to a carriage containing spaced parallel rods each having grippers for supporting a workpiece between the grippers of each rod, said longitudinal central axis of a workpiece when supported by said grippers forming an acute angle with a plane containing pivotal movement by said support arm.

16. The workpiece transfer according to claim 15 further including at least one member retaining one rod of said spaced parallel rods for pivotal movement of grippers supported thereby into and out of engagement with a workpiece, a resilient member for pivotally urging said one rod in a direction for supporting a workpiece by said grippers, a cam follower joined by a crank arm to said one rod, and cams including cam surfaces to engage with said cam follower for pivoting grippers of said one rod in a direction away from supporting engagement with a workpiece for receiving and delivering a workpiece in each of said first orientation and said second orientation.

17. A method for loading and unloading workpieces for a decorating machine, said method including the steps of:
   releasably gripping a workpiece for changing the orientation thereof from a first orientation to a second orientation wherein a workpiece in said first orientation has a longitudinal central axis orientated in one of vertical or horizontal orientations and in said second orientation has a longitudinal central axis in the other of said vertical or horizontal orientation;
   rotating the gripped workpiece about a rotational axis forming acute angles with said longitudinal central axis of a workpiece in each of said vertical and horizontal orientations; and
   displacing the gripped workpieces in a plane generally parallel with said rotational axis with said step of rotating to control receiving and delivery of a workpiece as the longitudinal central axis thereof approaches each of said first orientation and said second orientation.

18. The method according to claim 17 wherein each of said acute angles is 45°.

19. The method according to claim 17 including the further steps of conveying workpieces with the longitudinal central axis thereof in each of said vertical and said horizontal orientations.

20. The method according to claim 17 including the further step of controlling rotation of a gripped workpiece by said step of rotating in timed relation with pivoting of the gripped workpiece by said step of pivotally displacing to orientate a workpiece substantially vertical for travel to support a workpiece in said vertical orientation and to orientate a workpiece substantially horizontal for travel to support a workpiece in said horizontal orientation.

21. The method according to claim 20 wherein said step of controlling further includes using a stationary cam track to impart said pivoting of the gripped workpiece for said step of pivotally displacing the gripped workpiece.

22. The method according to claim 17 including the further step of decorating a workpiece while rotated about said longitudinal central axis in a horizontal orientation and transferring a workpiece with said longitudinal central axis thereof in a vertical orientation before and after said step of decorating a workpiece.

23. A workpiece transfer including the combination of:
   a transport conveyor for carrying workpieces having an elongated longitudinal axis, said conveyor supporting each of said workpieces with said elongated longitudinal axis in a vertical orientation;
   a decorator conveyor including spaced apart workpiece carriers to support a workpiece for rotation about the longitudinal axis of the workpiece in a horizontal orientation;
   a plurality of workpiece grippers for supporting said workpieces during movement of the longitudinal axis thereof between said horizontal orientation and said vertical orientation;
   a drive to reciprocate said workpiece grippers and a workpiece gripped thereby generally parallel with a rotational axis while rotating said workpiece grippers and workpiece gripped thereby about said rotational axis, said rotational axis forming acute angles with said longitudinal central axis of a workpiece in each of said vertical orientation and said horizontal orientation.

24. The workpiece transfer according to claim 23 wherein each of said acute angles is 45°.

25. The workpiece transfer according to claim 24 wherein said drive includes control rods engaging a cam for pivoting said workpiece grippers in a timed relation with rotary motion of said workpiece gripper by said drive shaft for continuous motion of a workpiece in a substantially matched speed and direction of conveyance of a workpiece by said transport conveyor and said decorator conveyor.

26. The workpiece transfer according to claim 24 wherein said drive further includes an actuating rod slidably supported by said drive to reciprocate said workpiece grippers about said rotational axis in timed relation with rotation of said workpiece gripper about said rotational axis to orientate said workpiece gripper substantially vertical for travel to support a workpiece in said vertical orientation and to orientate said workpiece gripper substantially horizontal for travel to support a workpiece in said horizontal orientation.

27. The workpiece transfer according to claim 26 wherein said drive further includes a stationary cam having a cam track engaged with a cam follower supported by said actuating rod and movable along said cam track by said drive.

28. The workpiece transfer according to claim 23 wherein said plurality of workpiece grippers each include a support arm joined by said pivot for rotation about said rotational axis forming acute angles, a mounting fixture joining said support arm to a carriage containing spaced parallel rods few supporting a workpiece between the grippers of each rod, said longitudinal central axis of a workpiece when supported by said grippers forming an acute angle with a plane containing pivotal movement by said support arm.

29. The workpiece transfer according to claim 28 wherein said drive further including at least one member retaining one rod of said spaced parallel rods for pivotal movement of grippers supported thereby into and out of engagement with a workpiece, a resilient member for pivotally urging said one rod in a direction for supporting a workpiece by said grippers, a cam follower joined by a crank arm to said one rod, and cams including cam surfaces to engage with said cam follower for pivoting grippers or said one rod in a direction away from supporting engagement with a workpiece for receiving said delivering a workpiece in each of said first orientation and said second orientation.

* * * * *